United States Patent
Murakami et al.

(10) Patent No.: US 9,065,526 B2
(45) Date of Patent: Jun. 23, 2015

(54) RELAY DEVICE, RELAY METHOD, AND RELAY DEVICE CONTROL PROGRAM

(75) Inventors: Takuya Murakami, Tokyo (JP); Yoshiaki Okuyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 540 days.

(21) Appl. No.: 13/258,871

(22) PCT Filed: Mar. 15, 2010

(86) PCT No.: PCT/JP2010/054758
§ 371 (c)(1), (2), (4) Date: Sep. 22, 2011

(87) PCT Pub. No.: WO2010/110192
PCT Pub. Date: Sep. 30, 2010

(65) Prior Publication Data
US 2012/0015602 A1      Jan. 19, 2012

(30) Foreign Application Priority Data
Mar. 25, 2009   (JP) ................................ 2009-073220

(51) Int. Cl.
*H04B 7/14*  (2006.01)
*H04B 7/155* (2006.01)

(52) U.S. Cl.
CPC ..................... *H04B 7/155* (2013.01)

(58) Field of Classification Search
CPC ............... H04B 7/18513; H04B 7/195; H04B 7/18521; H04B 7/18539; H04B 7/18534; H04B 7/14
USPC ........................................................ 455/11.1
See application file for complete search history.

(56) References Cited

U.S. PATENT DOCUMENTS

| | | | | |
|---|---|---|---|---|
| 7,860,931 | B2 * | 12/2010 | Yabe et al. | 709/206 |
| 8,380,782 | B2 * | 2/2013 | Kakuta et al. | 709/201 |
| 8,457,548 | B2 * | 6/2013 | Takada et al. | 455/7 |
| 8,521,080 | B2 * | 8/2013 | Sakoda et al. | 455/7 |
| 2004/0018834 | A1 * | 1/2004 | Talaie et al. | 455/422.1 |
| 2004/0063449 | A1 * | 4/2004 | Fostick | 455/517 |
| 2005/0136835 | A1 * | 6/2005 | Suwa | 455/11.1 |

(Continued)

FOREIGN PATENT DOCUMENTS

| | | |
|---|---|---|
| JP | 2001237984 A | 8/2001 |
| JP | 2001273225 A | 10/2001 |
| JP | 2002278860 A | 9/2002 |

OTHER PUBLICATIONS

International Search Report for PCT/JP2010/054758 mailed May 25, 2010.

*Primary Examiner* — Bobbak Safaipour
(74) *Attorney, Agent, or Firm* — Sughrue Mion, PLLC

(57) ABSTRACT

A relay device which can store acquired information in the case where it relays a communication is provided. The relay device of the present invention is provided with: a first connecting means for connecting with a first communication device; a second connecting means for connecting with a second communication device; and a relaying means which is connected with the first communication device using the first connecting means and is connected with the second communication device using the second connecting means, for relaying first information which is communicated between the first communication device and the second communication device, and outputting second information which is all or a part of the first information.

23 Claims, 18 Drawing Sheets

(56) References Cited

U.S. PATENT DOCUMENTS

| | | | |
|---|---|---|---|
| 2007/0237107 A1* | 10/2007 | Jang et al. | 370/315 |
| 2008/0056173 A1* | 3/2008 | Watanabe | 370/315 |
| 2009/0181693 A1* | 7/2009 | So et al. | 455/453 |
| 2009/0190634 A1* | 7/2009 | Bauch et al. | 375/211 |
| 2010/0293290 A1* | 11/2010 | Arashin et al. | 709/232 |
| 2011/0051651 A1* | 3/2011 | Wu et al. | 370/312 |

\* cited by examiner

RELAY DEVICE, RELAY METHOD, AND RELAY DEVICE CONTROL PROGRAM

TECHNICAL FIELD

The present invention relates to a relay device, a relay method and a relay device control program which relays communications.

BACKGROUND ART

In the case that a communication device communicates with other communication devices or with networks and the communication device cannot directly connect with them, then a predetermined relay device can be utilized.

Suppose that a communication device is available, wherein it equips with only a short range wireless communication function (henceforth, referred to as "short range wireless communication device") such as a wireless LAN (Local Area Network) or the like which conforms to IEEE 802.11 standard which the IEEE-802 LAN/MAN Standards Committee of IEEE (Institute of Electrical and Electronic Engineers) standardized. In order to connect the short range wireless communication device with a network such as an Internet and the like, communications need to be relayed at a base station such as a wireless LAN access point or the like. In other words, in order to connect the short range wireless communication device with a wide area network, a predetermined relay device is required.

An example of the relay device which is applicable to the above-mentioned object includes a communication device having both a function of connecting with a wide area wireless network such as a mobile phone network, and a function of communicating with a wireless LAN. A specific example of the relay device includes so-called a "dual-mode mobile phone terminal", which is a mobile phone and can concurrently connects with the mobile phone network and with a wireless LAN communication device. When the relay device relays the communications, a communication device having only a wireless LAN communication function (henceforth, referred to as "wireless LAN communication device") can be connected with the wide area network. That is, by using a dual-mode mobile terminal as the relay device, the wireless LAN communication device can be connected with the wide area network such as the Internet, the mobile phone network and the like. Therefore, by carrying around this kind of the relay device, as far as the wireless LAN communication device may exist within a range of the mobile phone network, the wireless LAN communication device can be connected with the wide area network.

Some dual-mode mobile phone terminals can operate not only as the relay device and the mobile phone but also as a terminal accessible to the Internet. That is, because some kinds of dual-mode mobile phone terminal have embedded client software including a mailer and a web browser, it can be used for reading and writing a mail and can browse webs. In this way, the dual-mode mobile terminal can receive services from the Internet. At the same time, the dual-mode mobile terminal can relay communications of the Internet by connecting with an external wireless LAN communication device via a wireless LAN. Accordingly, the external wireless LAN communication device can receive services from the Internet.

Note that, a relay function of the dual-mode mobile phone terminal includes only relaying communications of an external communication device. The functions which the dual-mode mobile phone terminal includes and the functions which the external communication device includes are completely separated, and there are no relations among them. For example, even in the case that both the dual-mode mobile phone terminal and the external device have the web browser function, these browser functions are not interlocked. Therefore, even though the external device and the dual-mode mobile phone terminal access the same website, a URL (Uniform Resource Locator) has to be inputted independently in the respective devices.

Incidentally, as the dual-mode mobile phone terminal mentioned above, a dual communication device having both a communication terminal function and the relay function can acquire information which the external communication device sends and receives when it relays the communications of the external communication device as the relay device. Accordingly, by storing the information, the information can be utilized in the case of operating as the communication terminal. For example, in the case that an address and an URL or the like of the destination which the external communication device transmitted are utilized when the dual communication device communicates as the communication terminal, the address and the URL of the destination does not need to be designated once again. In this way, for the dual communication device, in the case that the acquired information while operating as the relay device can be utilized for the communications as the communication terminal, convenience is remarkably improved.

Information which a user input and can improve convenience in the case of being utilized for future communications include such as an ID (IDentification) and a password in addition to an address and a URL or the like.

Further, in addition to the information which the user inputs directly, use of an access history of web browsers, which is a selection history of the connected destination by the user, is also effectively utilized. Moreover, cookies which are often used in the web browser are also effectively utilized. The cookie is information transmitted from a server to a terminal and stored in the terminal, and the server can use it, in order to perform a predetermined confirmation in the case of accessing to the same server. Accordingly, by utilizing the cookies in addition to the URLs, the relay device can access equally with the external communication device. In addition, in the case that it stores information such as session identification information (i.e. session ID) for identifying communications between the external communication device and the web server, it can also utilize the information. That is, the relay device can succeed the session and continue the communications on behalf of the external communication device by using the stored session ID.

As an example, a relay device which relays data communications between an electronic apparatus and a communication device is disclosed in the Japanese Patent Application Laid-Open No. 2002-278860 (henceforth, referred to as "the patent document 1"). The relay device disclosed in the patent document 1 receives an access request from the electronic apparatus, and relays the communications between the electronic device and the communication device.

In addition, a communication adapter for a mobile phone game machine which can connect a portable game machine with a provider terminal device is disclosed in the Japanese Patent Application Laid-Open No. 2001-237984 (henceforth, referred to as "the patent document 2"). The communication adapter disclosed in the patent document 2 memorizes connecting destination information at a time when the portable game machine communicates with the provider terminal device. The portable game machine can access the desired connecting destination using the connecting destination information.

BRIEF SUMMARY OF THE INVENTION

Problems to be Solved

The relay device disclosed in the patent document 1 has an embedded communication function for the relay device. However, the relay device does not store information concerning an access request from the electronic apparatus. Therefore, after a communication between the electronic apparatus and the communication device has finished, the relay device cannot communicate using the information concerning the access performed in the past. Accordingly, in the case that the relay device itself tries to access the same information using an embedded communication function, the address and URL or the like of the access destination have to be inputted again.

The communication adapter disclosed in the patent document 2 memorizes the connecting destination information for communicating with the portable game machine. However, the connecting destination information is fixed information and is not information on a connecting destination which the portable game machine accessed and memorized in the past. Here, a case is considered in which, by adding the communication function to the communication adapter, a communication device similar to the above-mentioned dual communication device is constituted. In this case, a situation should be considered when the communication adapter tries to access again the information which was accessed in the past by using its communication function. However, even in this situation, because the communication adapter disclosed in the patent document 2 does not store the connecting destination accessed in the past, the connecting destination information has to be inputted once again.

Consequently, the technology disclosed in the patent document 1 and 2 has a problem that the information relayed by the relay device at the time of the communications in the past cannot be utilized effectively.

Object of the Invention

The present invention was invented in view of the above-mentioned technical problems, and an object is to provide a relay device, a communication method and a communication control program which can store acquired information at a time when communications are relayed.

Means for Solving the Problems

The relay device according to the present invention is characterized by comprising: a first connecting means for connecting with a first communication device; a second connecting means for connecting with a second communication device; and a relaying means which is connected with the first communication device using the first connecting means and is connected with the second communication device using the second connecting means, for relaying first information which is communicated between the first communication device and the second communication device, and outputting second information which is all or a part of the first information.

A relay method according to the present invention is characterized by comprising: a step which relays the first information which is communicated between the first communication device and the second communication device; and a step which outputs the second information which is all or a part of the first information.

A relay device control program according to the present invention makes a computer which is mounted on the relay device and is connected with the first communication device and the second communication device to execute functions comprising: a relay means which relays the first information which is communicated between the first communication device and the second communication device; and an output means which outputs the second information which is all or a part of the first information.

Effect of the Invention

The relay device, the relay method and the relay device control program according to the present invention output acquired information to outsides in the case that communications are relayed. Therefore, by storing the information, it can utilize the information in the case of executing future communications. Accordingly, it brings an effect that it does not need to input or acquire again the information when starting a communication.

EXEMPLARY EMBODIMENT (First Embodiment)

Figure 1:
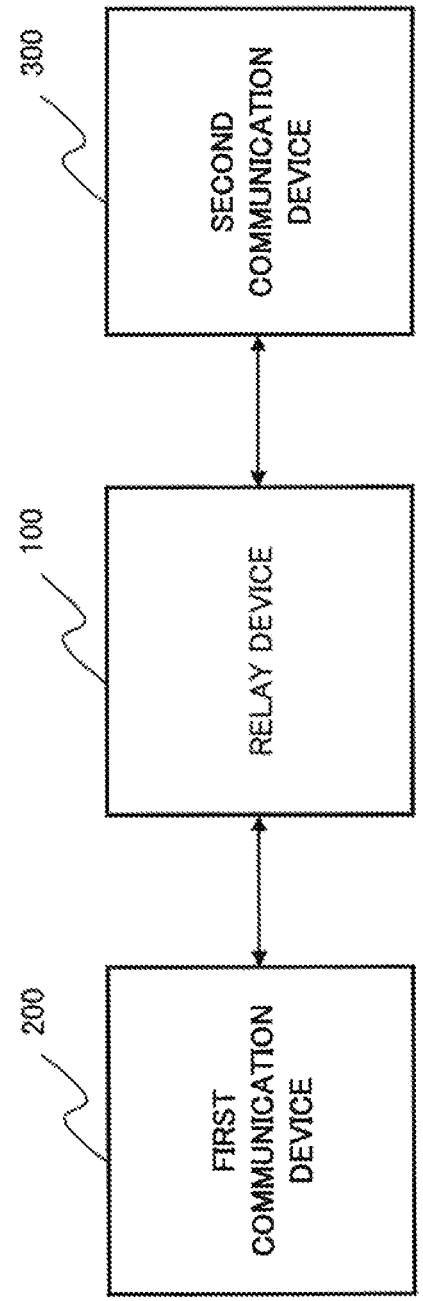
FIG. 1 is a block diagram showing a configuration of a communication system according to a first embodiment of the present invention.
Figure 2:
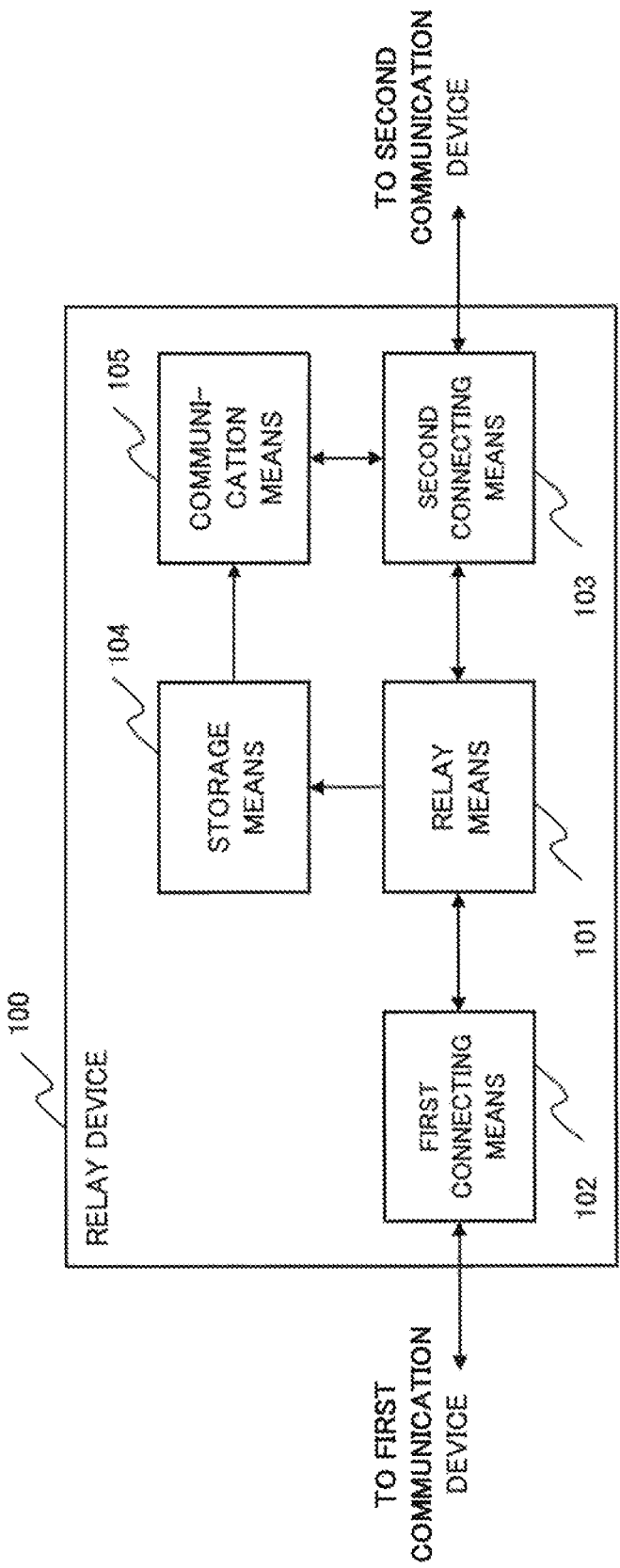
FIG. 2 is a block diagram showing a configuration of a relay device according to the first embodiment of the present invention.

The first embodiment of the present invention will be described in detail with reference to the drawings. FIG. 1 is the block diagram showing the configuration of the communication system according to the embodiment. FIG. 2 is the block diagram showing the configuration of the relay device according to the embodiment.

As shown in FIG. 1, the communication system according to the embodiment includes a relay device 100, a first communication device 200 and a second communication device 300. The first communication device 200 is connected with the relay device 100, and the relay device 100 is connected with the second communication device 300. Further, the relay device 100 relays communications between the first communication device 200 and the second communication device 300.

The first communication device 200 and the second communication device 300 are communication apparatus such as a communication terminal or a server having a wired communication function or a wireless communication function. A specific example of the first communication device 200 and the second communication device 300 includes the mobile phone, a web server and an electronic apparatus such as a PC (Personal Computer), a PDA (Personal Digital Assistance) and a game machine having communication functions. Those electronic apparatus which do not have an embedded communication function can be used as the first communication device 200 or the second communication device 300, if the electronic apparatus has a function of enabling connection with predetermined communication means such as the communication card.

The relay device 100 is connected with each of the first communication device 200 and the second communication device 300 by wired or wireless transmission, and relays communications between the first communication device 200 and the second communication device 300. A specific example of the relay device 100 includes a dual-mode mobile phone or a mobile phone with a data communication function. In addition, an access point, a router and a modem which have an embedded communicating function as a terminal (i.e. terminal function) are also the specific examples of the relay device 100.

The internal configuration of the relay device 100 will be described. As shown in FIG. 2, the relay device 100 includes a relay means 101, a first connecting means 102, a second connecting means 103, a storage means 104 and a communication means 105.

The first connecting means 102 connects the relay device 100 with the first communication device 200. The second connecting means 103 connects the relay device 100 with the second communication device 300. A specific example of the first connecting means 102 and the second connecting means 103 includes a short range wireless communication means such as the wireless LAN, Bluetooth (registered trademark), ZigBee (registered trademark) or the like, a long range wireless communication means such as the mobile phone or the like, a wired communication line using telephone circuits such as a fixed telephone or the like and a wired connection using cables or the like.

The relay means 101 relays the communications between the first communication device 200 and the second communication device 300. Specifically, the relay means 101 receives information which the first communication device 200 transmitted via a first connecting means 12, and transmits it to the second communication device 300 via a second connecting means 13. Conversely, the relay means 101 receives information which the second communication device 300 transmitted via the second connecting means 13 and transmits it to the first communication device 200 via the first connecting means 102. Consequently, the relay means 101 temporally receives the information which the first communication device 200 transmitted and information which the second communication device 300 transmitted, and transfers them to the second communication device 300 and the first communication device 200 respectively.

The information which the first communication device 200 transmitted to the second communication device 300 and the information which the second communication device 300 transmitted to the first communication device 200 are denoted as "communication information". A relay means 11 passes all or a part of the received communication information to the storage means 104. Hereafter, the communication information which is passed to the storage means 104 is denoted as "storage information".

The storage means 104 stores the storage information. As will be described later, the storage information is used in the case that the communication means 105 communicates with the second communication device 300. With respect to the storage information, the following specific communication information are stored.

1) Device Identification Information

Device identification information is identification information which designates the second communication device 300. In the case that the second communication device 300 is connected with the network, an address of the second communication device 300 is equivalent to the device identification information. In the case that the network is the Internet, an IP address is equivalent to the device identification information.

2) Information Identification Information

Information identification information is identification information which designates information stored in the second communication device 300. Specifically, a file name or the like of a file in which the storage information is stored is equivalent to the information identification information.

3) Information Storage Location Identification Information

Information storage location identification information is identification information which designates a location where information is stored. Specifically, a URL is equivalent to the information storage location identification information. As is well known, the URL includes such as a protocol name, a host name, a path name and a port number. Accordingly, the URL includes the device identification information as the host name and includes the information identification information as the path name.

4) Program Identification Information

Program identification information is information for identifying an application program which is running in the second communication device 300 and is communicating with an application program which is running in the first communication device 200. For example, a port number is equivalent to the program identification information.

5) Communication Identification Information

Communication identification information is identification information for identifying a communication which is exchanging between the first communication device 200 and the second communication device 300. For example, in the case that the second communication device 300 is the web server, the web server may transmit a session ID as the identification information for identifying that the communication is with the first communication device 200, to the first communication device 200 which is a client. In this case, the session ID is equivalent to the communication identification information.

6) Information for Authentication

Information for authentication is information transmitted from the first communication device 200 to the second communication device 300 in order to get a certification by the second communication device 300. For example, an ID and an associated password of the first communication device 200 is equivalent to the communication identification information.

In the case that the relay means 101 stores a part of the communication information as the storage information, the relay means 101 needs to extract the storage information from the communication information. It this case, various methods can be, considered for extracting the storage information.

One of the methods is to extract a defined partial information from such as n-th byte to m-th byte (n and m are natural numbers), which is fixed in advance, from a head of a packet which includes the communication information (i.e. first extracting method). Alternatively, a datum format of the packet and a kind of information which is to be stored can be set to the relay means 101 in advance. In this case, the relay device 100 analyzes the contents of the packet and extracts designated storage information (i.e. second extracting method). Kind of the communication information which is extracted as the storage information is fixed for both the first extracting method and the second extracting method.

Further, in order that the relay device 100 can extract the storage information, the transmission source of the communication information (i.e. the first communication device 200 or the second communication device 300) may includes in the communication information a direction code meaning a direction or a permission of the extraction of the storage information. In the case that the relay device 100 detects the direction code, it extracts the defined communication information as the storage information (i.e. third extracting method).

In the third extracting method, the information identification code which designates the information to be extracted can be included in the direction code. In the case of the third extracting method, the communication information to be extracted can be designated from outside.

The communication means 105 communicates with the second communication device 300 via the second connecting means 103 by using the above-mentioned storage information that the storage means 104 is storing.

Figure 3:
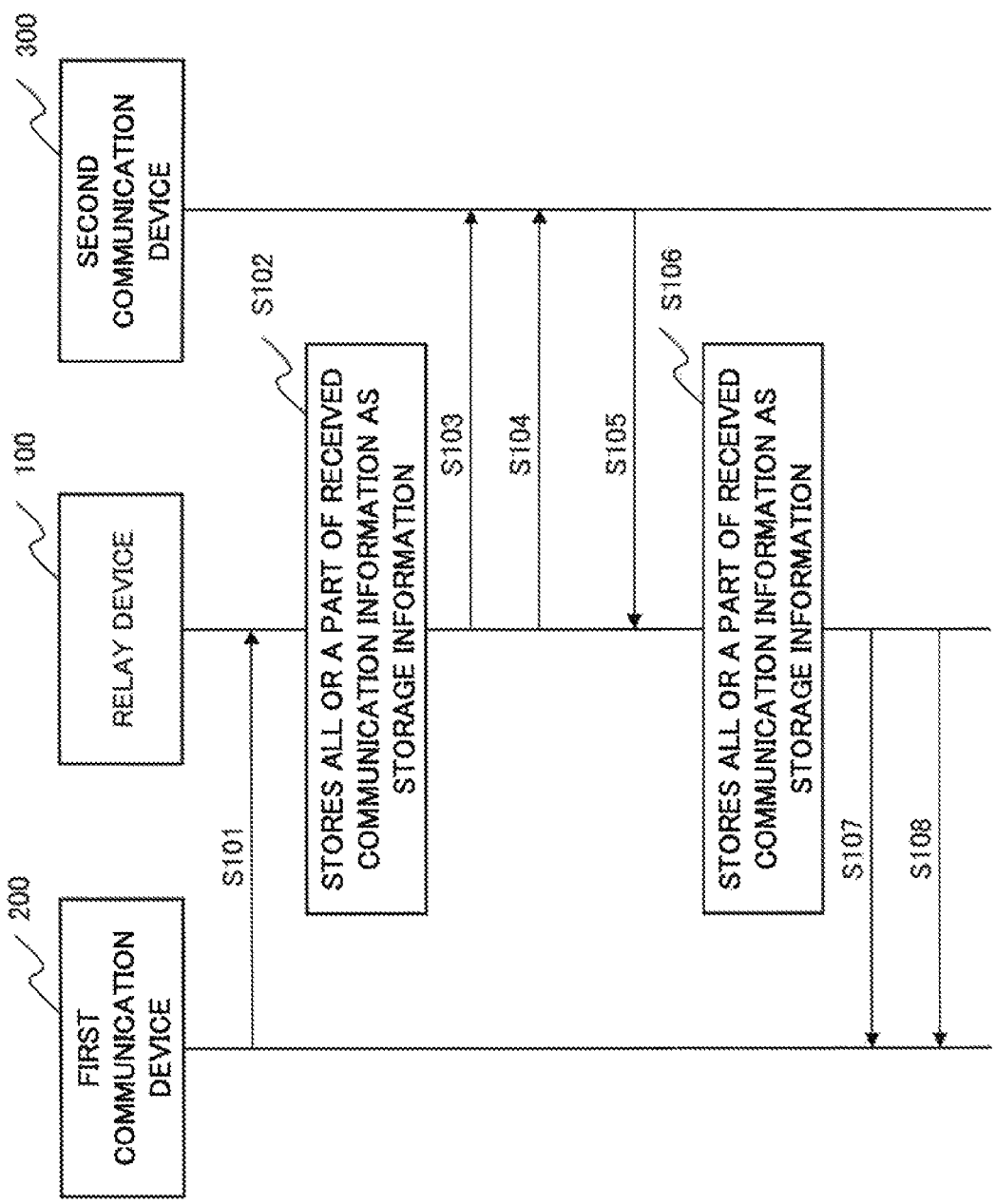
FIG. 3 is a sequence chart showing operations of the communication system according to the first embodiment of the present invention.

Next, operations of the communication system according to the embodiment will be described. FIG. 3 is the sequence chart showing the operations of the communication system according to the first embodiment. The sequence chart indicates the operations that information is transmitted from the first communication device 200 to the second communication device 300 at first, and then information is transmitted from the second communication device 300 to the first communication device 200.

At first, the first communication device 200 transmits the communication information for the second communication device 300 to the relay device 100 (Step S101). The relay device 100 receives the communication information and stores all or a part of it as the storage information (Step S102). At that time, the relay device 100 can extract and store a part of the communication information as the storage information. Then, the relay device 100 transmits entire communication information to the second communication device 300 (Step S103). The relay device 100 refers to the storage information and communicates with the second communication device 300 (Step S104). The relay device 100 can refer to the storage information at a time of the communication with the first communication device 200.

In the case that the communication information is transmitted from the second communication device 300 to the first communication device 200, the operations of the communication system is similar to the operations described above. That is, the second communication device 300 transmits the communication information for the first communication device 200 to the relay device 100 (Step S105). The relay device 100 receives the communication information and stores all or a part of the information as the storage information (Step S106). At that time, the relay device 100 can extract and store a part of the communication information as the storage information. Then, the relay device 100 transmits entire communication information to the first communication device 200 (Step S107). The relay device 100 refers to the storage information and communicates with the first communication device 200 (Step S108). The relay device 100 can refer to the storage information at a time of communication with the second communication device 300.

Note that, as it is clear from the above-mentioned descriptions, the relay device 100 independently performs relaying of the communication information from the first communication device 200 to the second communication device 300, and relaying of the communication information from the second communication device 300 to the first communication device 200. Accordingly, the order of transmission of the communication information by the first communication device 200 and the second communication device 300 which are shown in the sequence chart in FIG. 3 can be reversed. Alternatively, the first communication device 200 and the second communication device 300 can simultaneously transmit the communication information.

Figure 4:
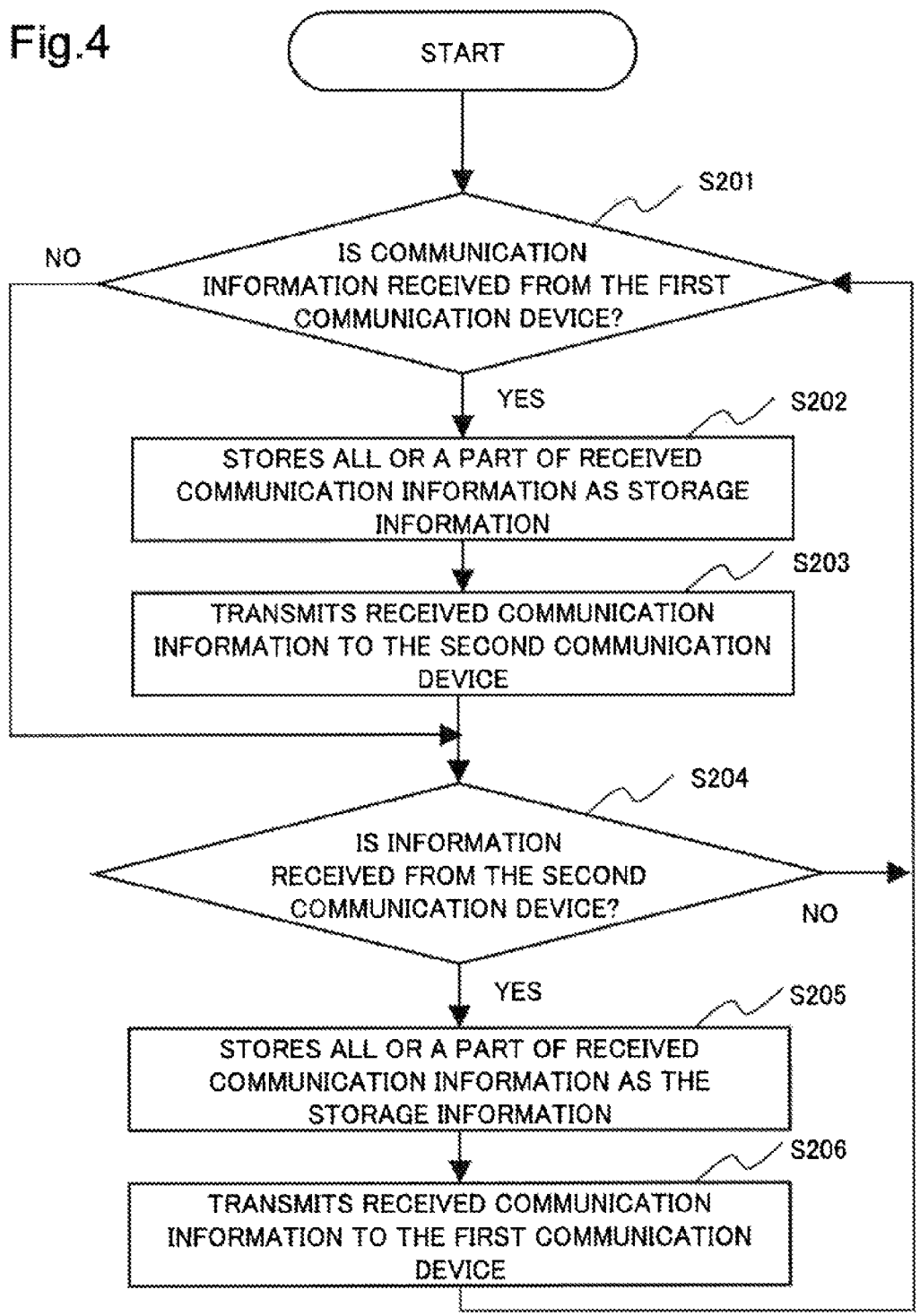
FIG. 4 is a flowchart showing operations of the relay device according to the first embodiment of the present invention.

The relay function by the relay device 1 can be executed using a program process. FIG. 4 is the flowchart showing the operations of the relay device according to the first embodiment.

The relay device 100 checks a presence of reception of the communication information from the first communication device 200 (Step S201). In the case that the relay device 100 receives the communication information, it stores all or a part of the information (Step S202). At that time, the relay device 100 can extract and store a part of the communication information as the storage information. Then, the relay device 100 transmits entire communication information to the second communication device 300 (Step S203).

For the case that the communication information is transmitted from the second communication device 300 to the first communication device 200, the operations of the relay device 100 is similar to the above-described operations. That is, the relay device 100 checks a presence of reception of the communication information from the second communication device 300 (Step S204). In the case that the relay device 100 receives the communication information, it stores all or a part of the information (Step S205). At that time, the relay device 100 can extract and store a part of the communication information as the storage information. Then, the relay device 100 transmits entire communication information to the first communication device 200 (Step S206).

The relay device 100 communicates with the first communication device 200 or with the second communication device 300 by referring to the storage information which is stored in step S202 or S205.

Figure 5:
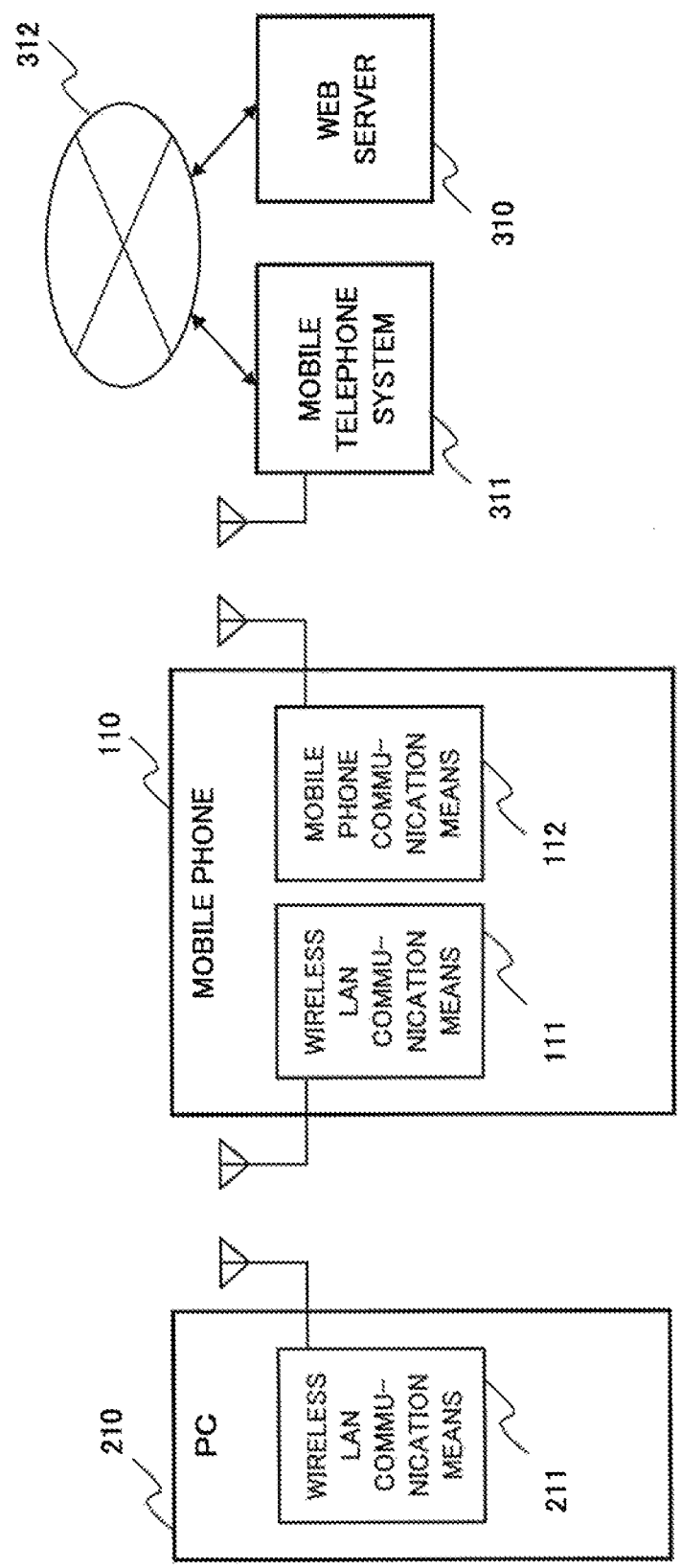
FIG. 5 is a block diagram showing a configuration of a specific example of the communication system according to the first embodiment of the present invention.
Figure 6:
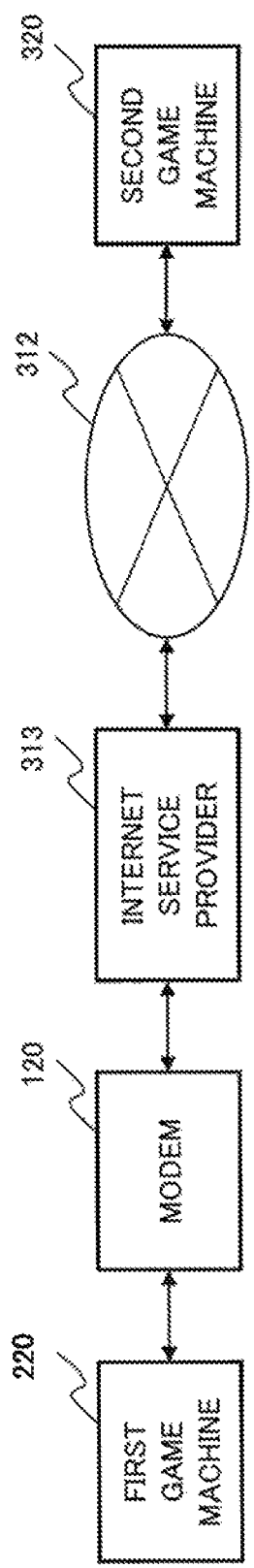
FIG. 6 is a block diagram showing a configuration of another specific example of the communication system according to the first embodiment of the present invention.

Here, a specific example of the communication system according to the first embodiment will be described. FIG. 5 and FIG. 6 are the block diagrams showing a specific example of the communication system according to the first embodiment. As a first example, as shown in FIG. 5, it considers a communication system wherein a PC and a web server are connected via the mobile phone. Here, a mobile phone 110, a PC 210 and a web server 310 correspond to the relay device 100, the first communication device 200 and the second communication device 300 respectively. The PC 210 accesses the web server 310 via the mobile phone 110, a mobile telephone system 311 and the Internet 312, and receives desired services.

The mobile phone 110 includes a wireless LAN communication means 111 and a mobile phone communication means 112 for connecting with the mobile telephone system 311. The PC 210 includes a wireless LAN communication means 211. The mobile telephone system 311 is connected with the Internet 312, and the web server 310 is connected with the Internet 312. Note that, the wireless LAN communication means 111 and the mobile phone communication means 112 correspond to the first connecting means 102 and the second connecting means 103 respectively.

Following to the above described system configuration, the PC 210 is connected with the mobile phone 110 using the wireless LAN communication means 211, and the mobile phone 110 is connected with the mobile telephone system 311. As the result, the PC 210 accesses the web server 310 and can receive services.

Incidentally, in the communication system shown in FIG. 5, while the mobile phone 110 is connected with the mobile telephone system 311 directly and physically by the mobile phone communication means 112, there is no physical connection with the web server 310. However, sending and receiving of the communication information between the mobile phone 110 and the web server 310 are possible. This kind of connection between the mobile phone 110 and the web server 310 is described that a logical connection is available even though there is no physical connection. The "physical connection" means a connected state where two communication devices can directly send and receive electrical signals, optical signals and physical signals via some kind of media. A connection of the mobile phone with a mobile phone base station and a connection of the mobile phone with a PC by a cable correspond to the physical connection. The "logical connection" means a connection by which two communication devices can directly send and receive information. The logical connection does not necessarily need to be connected so as to directly send and receive physical signals. That is, the logical connection includes not only a physical connection, but also a connection via no smaller than one physical connection path such as other communication devices and a network or the like. The logical connection includes a connection at a layer of the TCP between the mobile phone and the mobile phone base station, and a connection between the web browser program, which is executed in the mobile phone, and the web server program, which is executed in the web server on the Internet.

As it is described above, the second connecting means 103 can include not only a physical connection means but also a logical connection means, for the connection of the relay device 100 with the second communication device 300. The second connecting means 103 can be a connection means which connects both logically and physically. Similarly, the first connecting means 102 can be the physical connection means or the logical connection means.

The operations of the communication system in FIG. 5 will be described briefly. In the case that the PC 210 accesses the web server 310 and receives services, various communication information are stored as the storage information in the mobile phone 110. Here, the storage information includes an IP address of the web server, a URL which is a storage location of served information and a file name or the like of a file of which serving information are stored. Then, the mobile phone 110 can access the web server 310 and can receive the same information utilizing the storage information.

A second example of the communication system according to the first embodiment includes a communication system where a first game machine 220 and a second game machine 320 are connected via the modem 120 as shown in FIG. 6. Here, a modem 120, the first game machine 220 and the second game machine 320 correspond to the relay device 100, the first communication device 200 and the second communication device 300 respectively. The first game machine 220 and the second game machine 320 are connected via a network and are used for a so-called "online game".

The modem 120 includes both a wired connection means (not illustrated in the figure) which connects an external electronic apparatus with a cable, and a modem means (not illustrated in the figure) which connects with the Internet 312 via an Internet Service Provider 313. Some example of the modem means includes such as a modem for telephone circuits, an ADSL (Asymmetric Digital Subscriber Line) modem and a modem for optical communications. The first game machine 220 includes a wired connection means (not illustrated in the figure) for a connection with the modem 120. In addition, the second game machine 320 is also connected with the Internet 312 by the same method as the first game machine 220, the method via the above-mentioned mobile phone or other predetermined methods.

The wired communication means corresponds to the first connecting means 102, and the modem means corresponds to the second connecting means 103. Then, following to the system configuration described above, the first game machine and the second game machine are connected each other via the modem and the Internet, and online games can be played.

Further, for the communication system in FIG. 6, it is possible to deem that the modem 120 and the second game machine 320 are connected directly in a logical meaning. Accordingly, that the entire communication means, which is composed of from the modem 120 to the second game machine 320 including the Internet Service Provider 313 and the Internet 312, can be supposed as the second connecting means 103. The first connecting means 102 corresponds to a wired connection means between the modem 120 and the first game machine 220.

The operations of the communication system in FIG. 6 will be described briefly. In the case that the online game is played using the first game machine 220 and the second game machine 320, many kinds of communication information are stored as the storage information in the modem 120. The storage information in the system includes an IP address or the like of the first game machine 220 and the second game machine 320. In the case that each game machine can initiate a plurality of game programs, the identification information of the game program can be used as the storage information. Alternatively, in the case that each game machine can be used by a plurality of gamers, identification information or the like of the connection terminal of the operation panel (i.e. controller) which the gamer manipulates can be used as the storage information. However, in order that it is possible to store the identification information of the game program or the identification information or the like of the connection terminal of the controller by the relay device 100, it is presupposed that the communication control program which executes on each game machine should send and receive those information as the communication information.

Then, in the case that the modem 120 is equipped with the game machine function, the online game can be played between the modem 120 and the second game machine 320 using the storage information stored in the modem 120. In addition, it can connects a third game machine to the modem 120 instead of the first game machine 220, and by referring to the storage information by the third game machine, it can play the online game between the third game machine and the second game machine 320.

As described above, by storing the predetermined communication information as the storage information in the relay device 100, it can utilize the storage information for the communication using the relay device 100.

Figure 7:
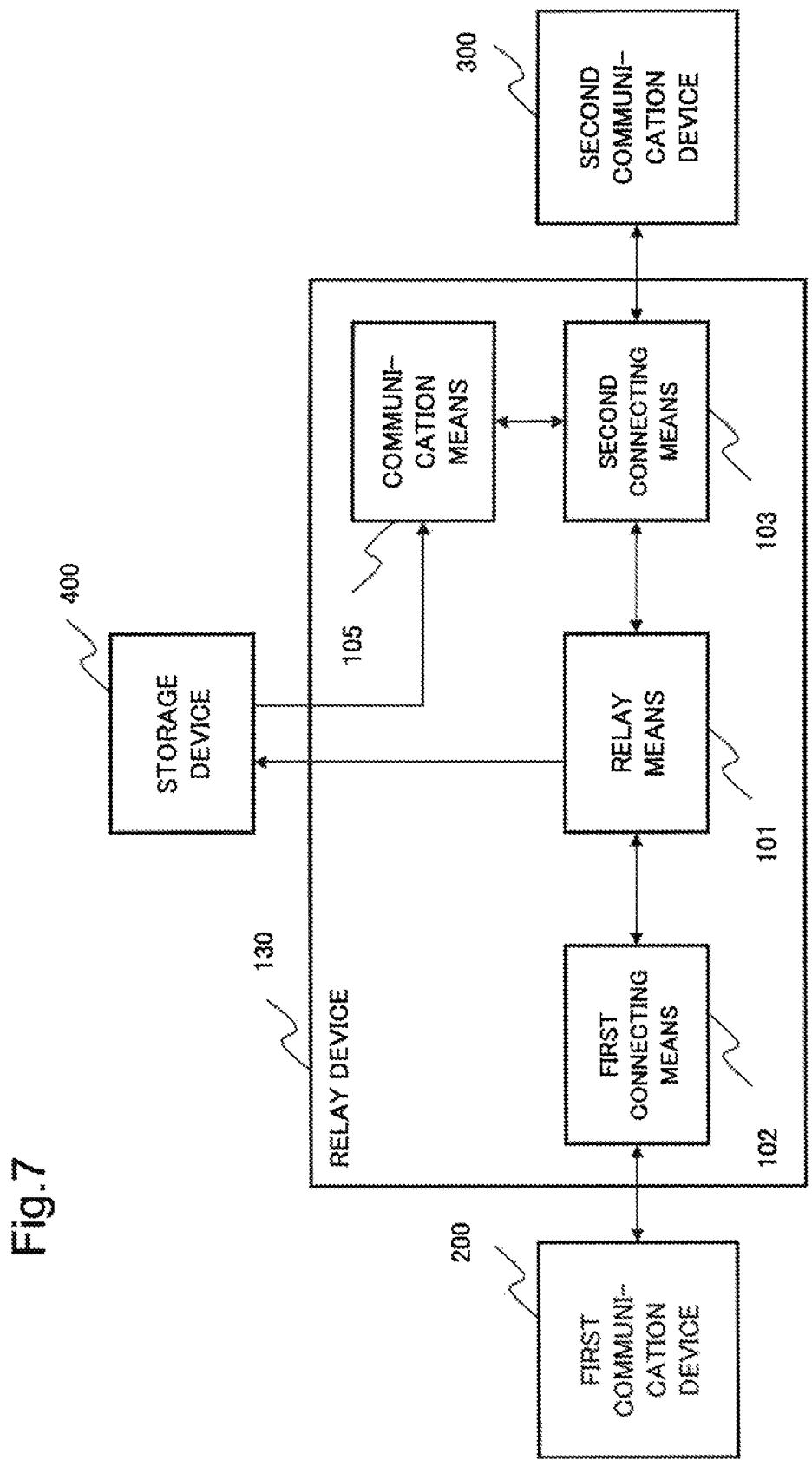
FIG. 7 is a block diagram showing a configuration of a variation example of the relay device according to the first embodiment of the present invention.

Further, the storage means 104 can be equipped at outside of the relay device 100. FIG. 7 is the block diagram showing the configuration of the variation example of the communication system according to the embodiment. As shown in the diagram, it can store the storage information in an external storage unit 400. For example, in the case that the relay device 130 is the mobile phone, it can use a memory card or the like as the external storage unit 400. The relay device 130 has a predetermined interface (not illustrated in the figure) for connecting with the storage unit 400 in order to store the communication information using a storage unit 4.

As it is described above, following to the communication system according to the first embodiment, the relay device stores the communication information which were sent and received between the first communication device and the second communication device. Then, the relay device communicates using the stored communication information. Accordingly, the information does not need to be inputted to the relay device once again, and an effect can be obtained that the communication histories in the past can be utilized effectively.

(Second Embodiment)

The relay device according to the first embodiment has the communication means. The communication means can be installed outside of the relay device. That is, an external third communication device 500 can refer to the storage information via the relay device and can communicate.

Figure 8:
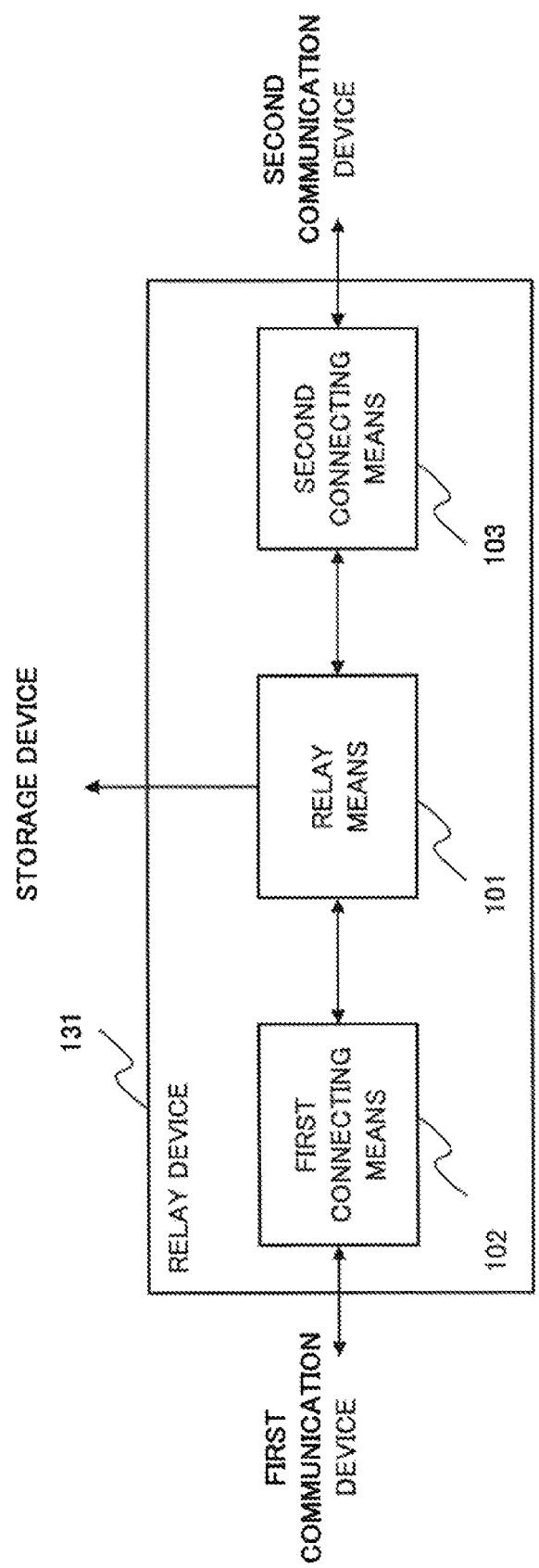
FIG. 8 is a block diagram showing a configuration of the relay device according to a second embodiment of the present invention.
Figure 9:
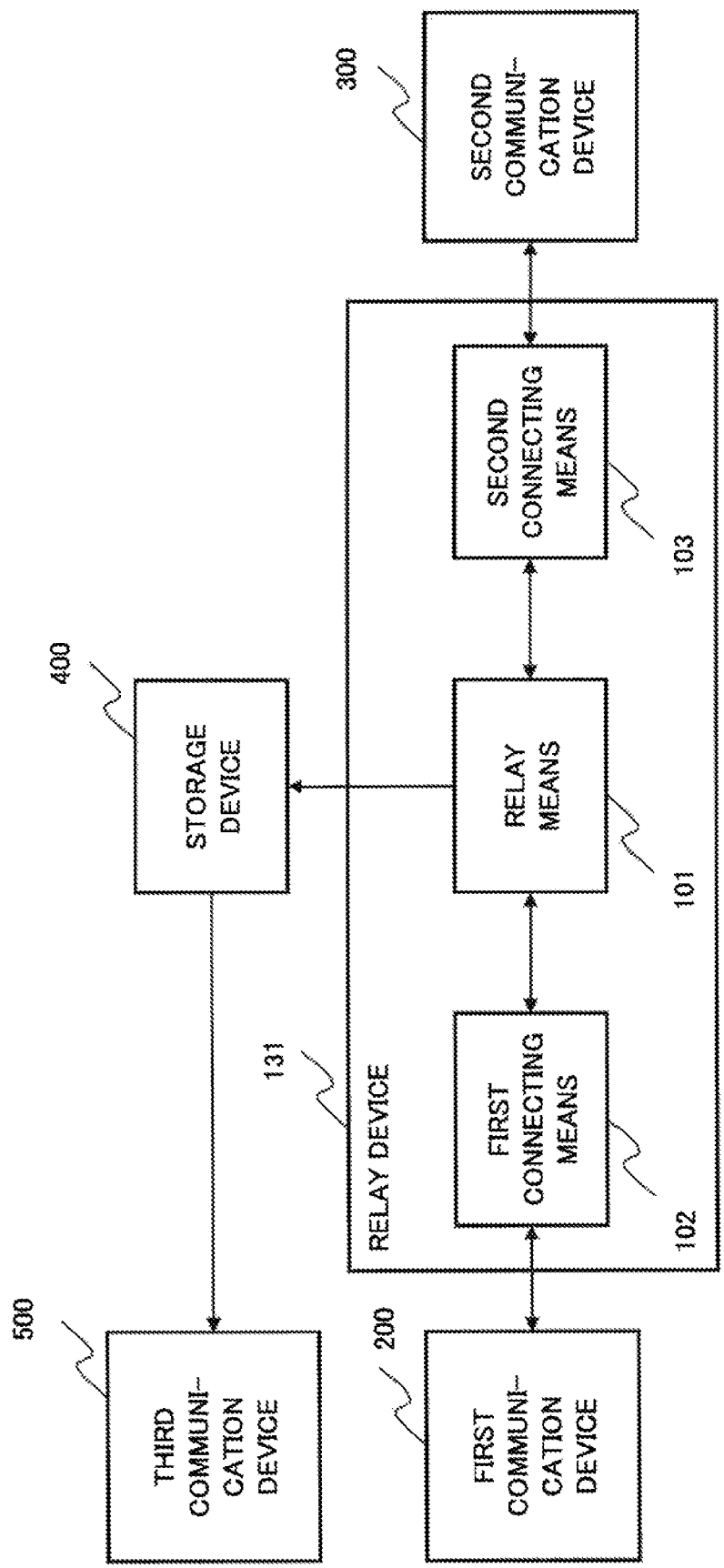
FIG. 9 is a block diagram showing a configuration of a communication system according to the second embodiment of the present invention.

FIG. 8 is the block diagram showing the configuration of the relay device according to the second embodiment. FIG. 9 is the block diagram showing the configuration of the communication system according to the second embodiment. FIG. 10, FIG. 11, FIG. 12, FIG. 13 and FIG. 14 are the block diagrams showing the configuration of the variation examples of the communication system in FIG. 9.

As shown in FIG. 8, a relay device 131 according to the second embodiment includes only the relay means 101, the first connecting means 102 and the second connecting means 103, but includes neither the communication means nor the storage means. The relay device 131 according to the present embodiment is a minimum configuration of the relay device, including only components essential to the relay device of the present invention. The relay device 131 in FIG. 8 will be described again at a later part as a third embodiment.

The relay means 101 outputs all or a part of the communication information to the external storage unit 400 as the storage information. The storage information is similar to one which is described in the first embodiment. The storage unit 400 stores the communication information.

Following to the communication system according to the second embodiment, a communication device which uses the storage information is the third communication device 500. The communication system according to the second embodiment has two kinds of system configuration depending on a path whereby the third communication device 500 acquires the storage information. As shown in FIG. 9, a first configuration is a system configuration where the third communication device 500 is connected with the external storage unit 400 of the relay device 131, and communicates using the storage information.

Figure 10:
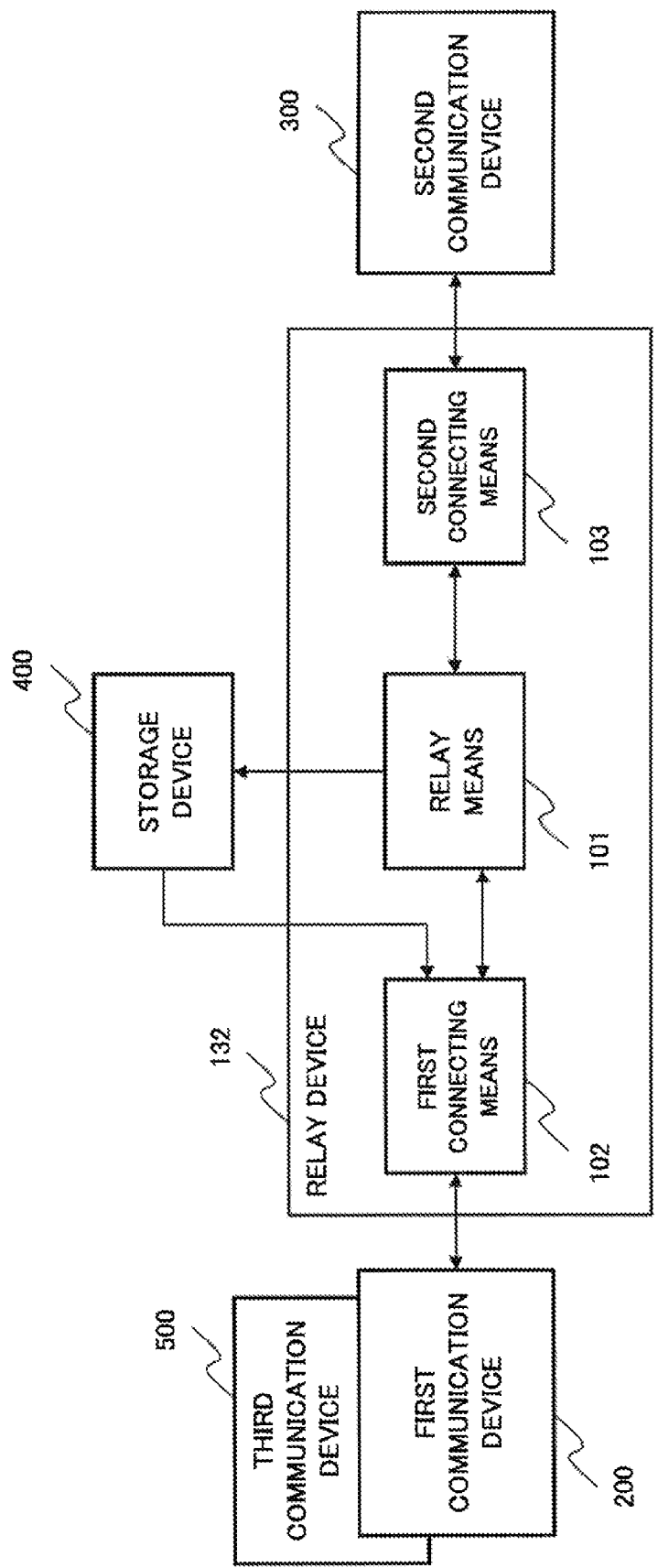
FIG. 10 is a block diagram showing a configuration of a first variation example of the communication system according to the second embodiment of the present invention.

As shown in FIG. 10, a second configuration is a system configuration where the third communication device 500 is connected with a relay device 132 via the first connecting means 102. Then, in the case that the third communication device 500 starts to communicate, the third communication device 500 refers to the storage information stored in the storage unit 400 via the first connecting means 102. Here, the first communication device 200 and the third communication device 500 may be an identical communication device.

Figure 11:
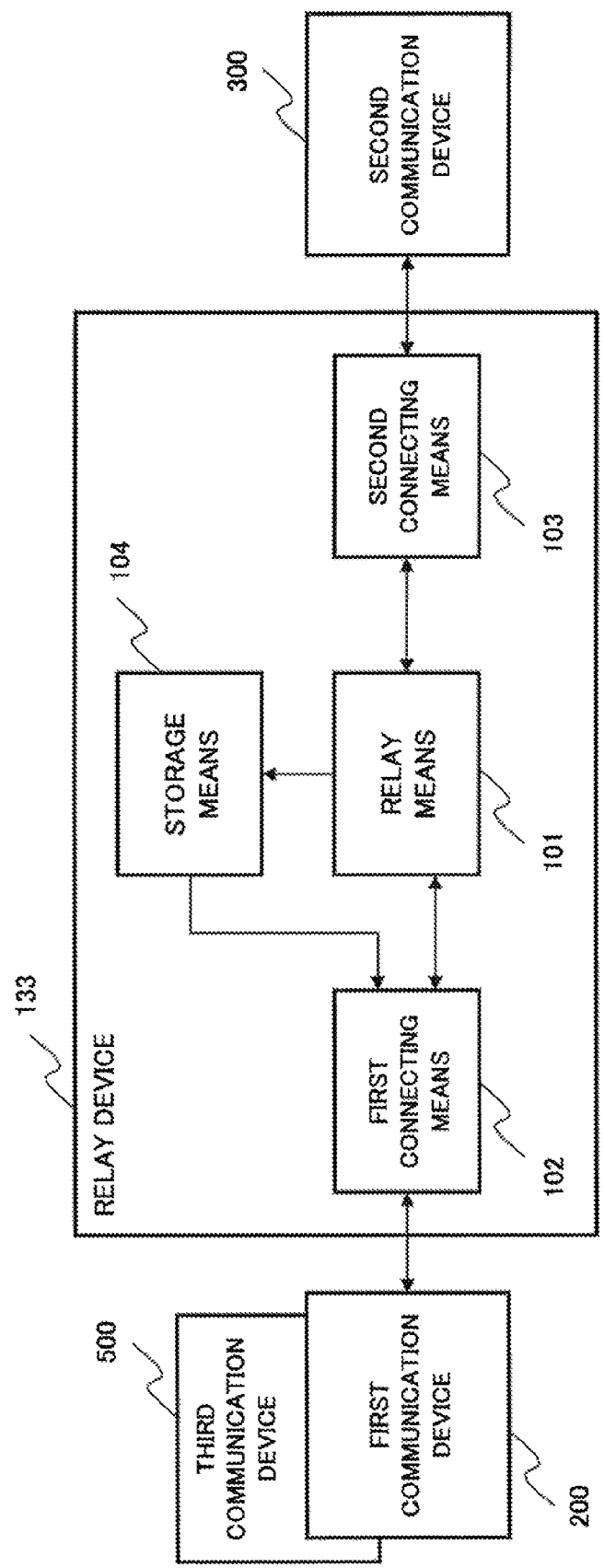
FIG. 11 is a block diagram showing a configuration of a second variation example of the communication system according to the second embodiment of the present invention.

In addition, as shown in FIG. 11, a relay device 133 may include the storage means 104 in it.

Figure 12:
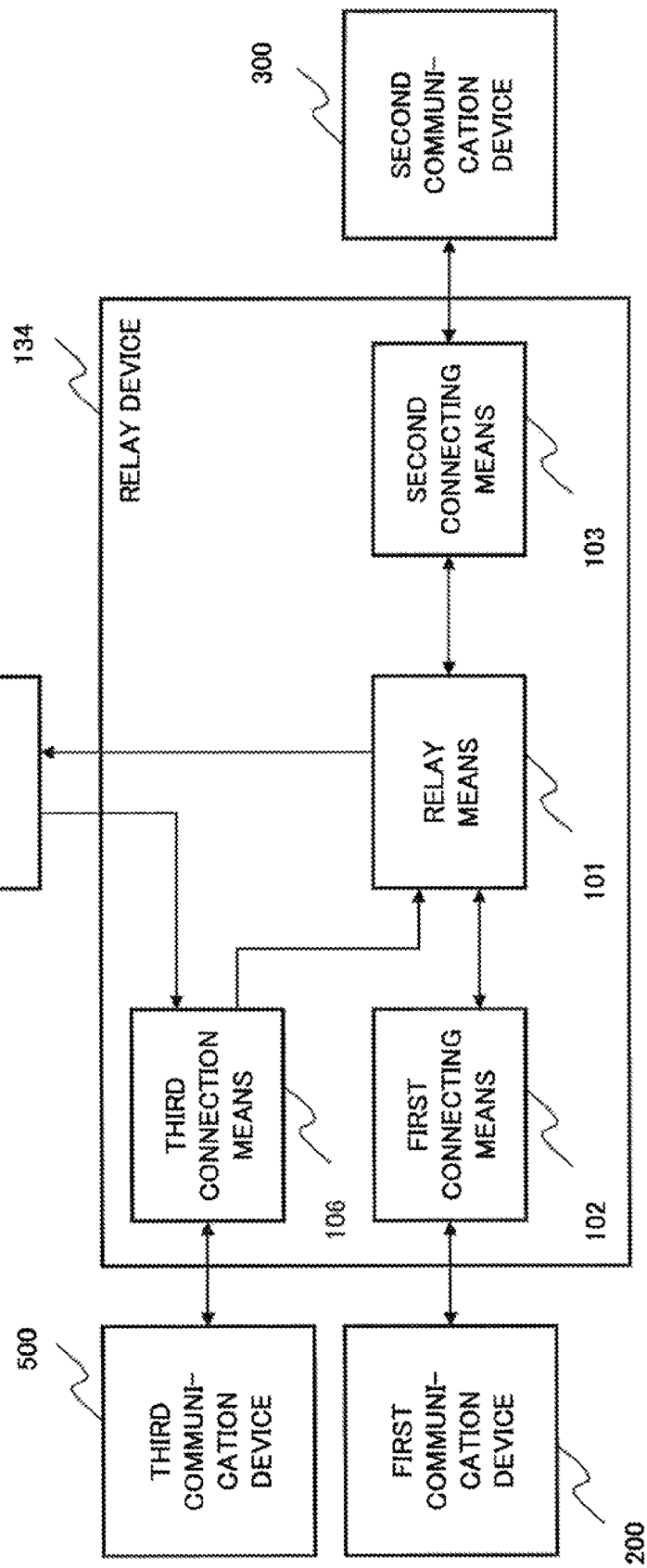
FIG. 12 is a block diagram showing a configuration of a third variation example of the communication system according to the second embodiment of the present invention.
Figure 13:
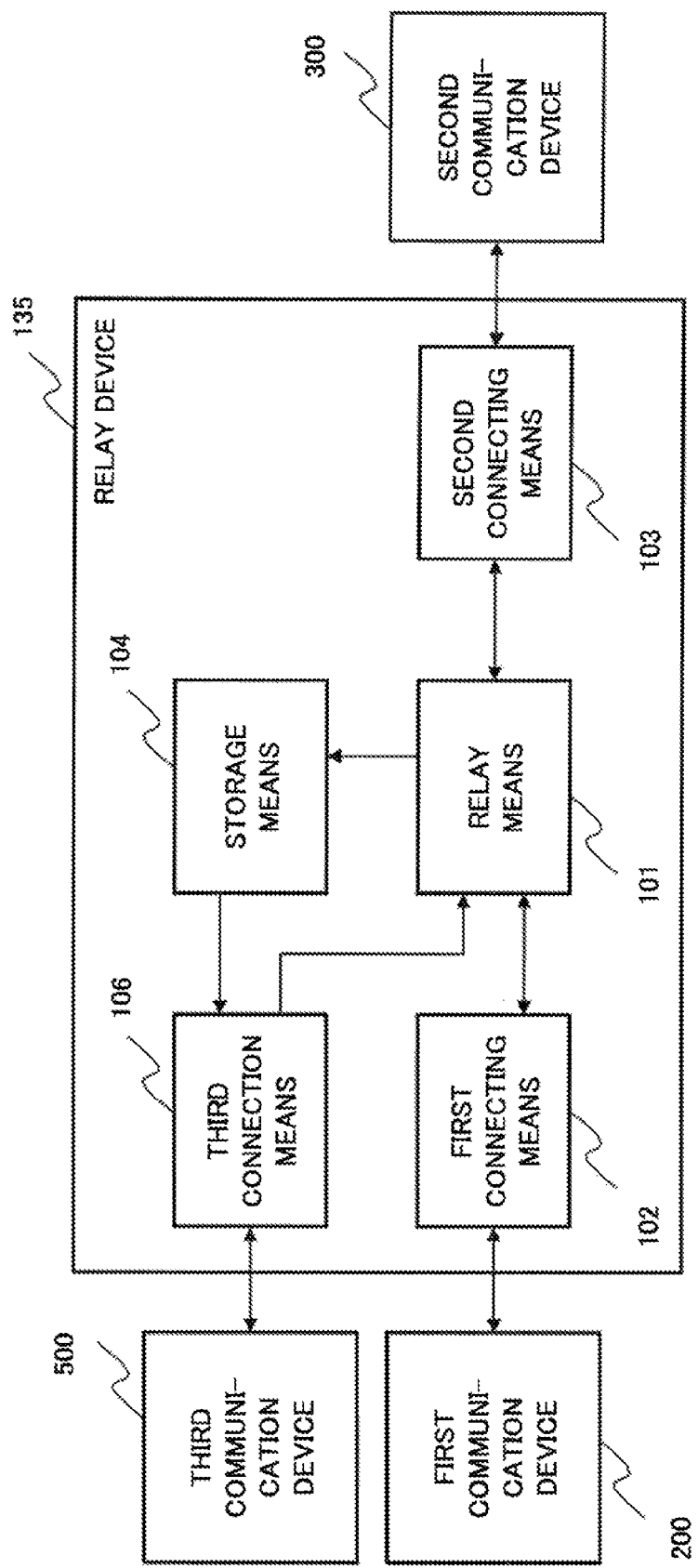
FIG. 13 is a block diagram showing a configuration of a fourth variation example of the communication system according to the second embodiment of the present invention.

Alternatively, as shown in FIG. 12, a relay device 134 may include a third connection means 106 in order to connect with the third communication device 500. As shown in FIG. 13, a relay device 135 may include the third connection means 106 and the storage means 104 in it.

Figure 14:
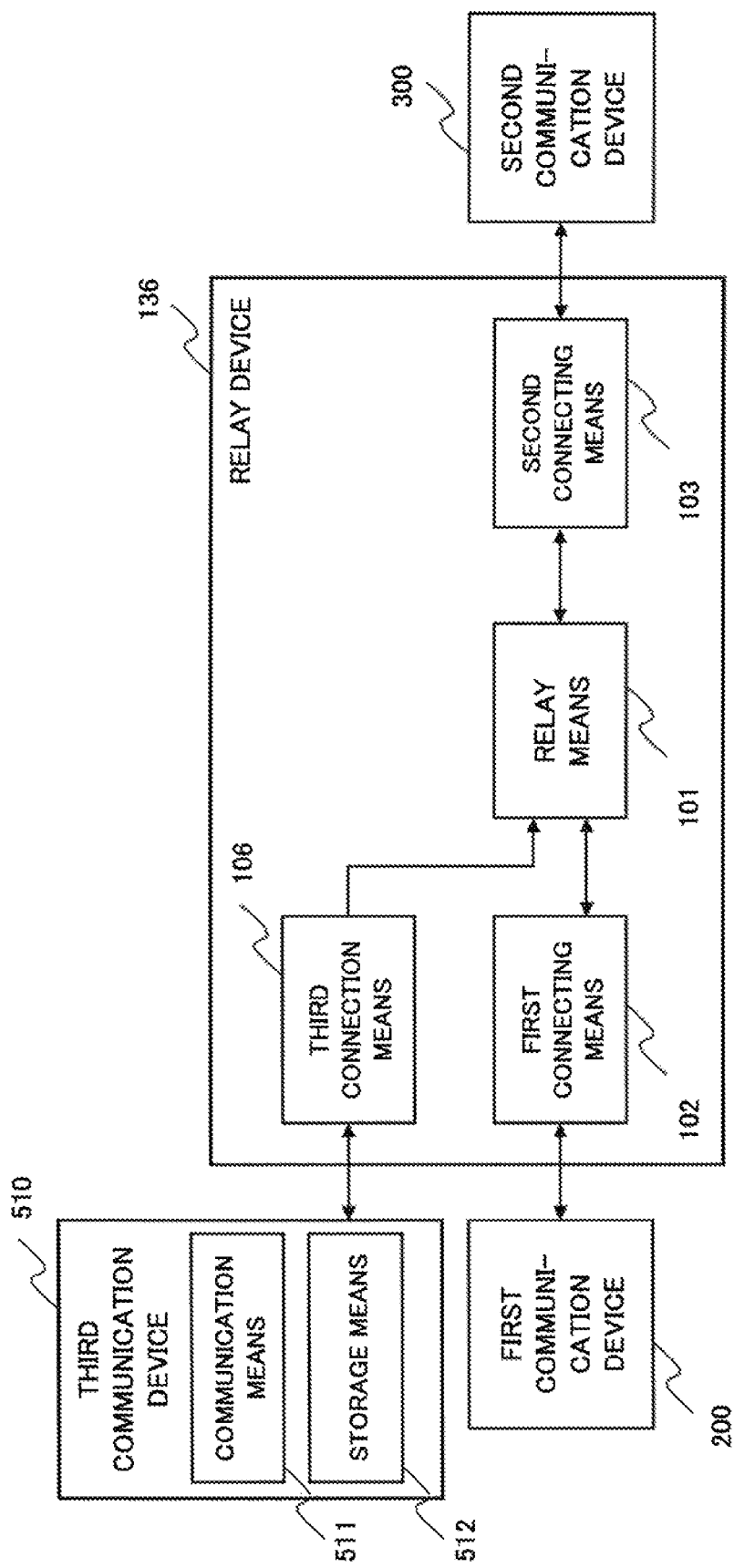
FIG. 14 is a block diagram showing a configuration of a fifth variation example of the communication system according to the second embodiment of the present invention.

Further, as shown in FIG. 14, a third communication device 510 can store the storage information using a storage means 511 which is installed inside of the third communication device 510. A relay device 136 includes the third connection means 106 for connecting with the third communication device 510. The storage information is transferred from the relay means 101 to the third communication device 510 via the third connection means 106.

The operations of the communication system according to the second embodiment shown in FIGS. 9 to 14 are different from those of the communication system according to the first embodiment on the point that the third communication device instead of the relay device, which is located outside of the relay device, communicates by referring to the storage information. Because the other operations are the same as the communication system according to the first embodiment, the descriptions will be skipped.

As described above, following to the communication system according to the second embodiment, the relay device stores the communication information which were sent and received during the communication between the first communication device and the second communication device in a dedicated location. Then, the third communication device communicates using the stored communication information. Accordingly, the information does not need to be inputted to the third communication device once again, and it brings an effect that the communication histories in the past can be utilized effectively.

(Third Embodiment)

The relay device 131 shown in FIG. 8 according to the third embodiment is the relay device of the minimum configuration which includes only components essential to the relay device of the present invention. The relay device 131 according to the embodiment includes only the relay means 101, the first connecting means 102 and the second connecting means 103, but includes neither the communication means nor the storage means.

In the relay device 131, the relay means 101 outputs to outside the communication information which are sent and received while the communications are executed between the first communication device and the second communication device. Accordingly, the first communication device or the second communication device, or other third communication devices can communicate using the outputted communication information.

As is described above, the relay device according to the third embodiment also brings an effect that the information does not need to be inputted again to the external communication device, and the communication history in the past can be utilized effectively.

(Fourth Embodiment)

Figure 15:
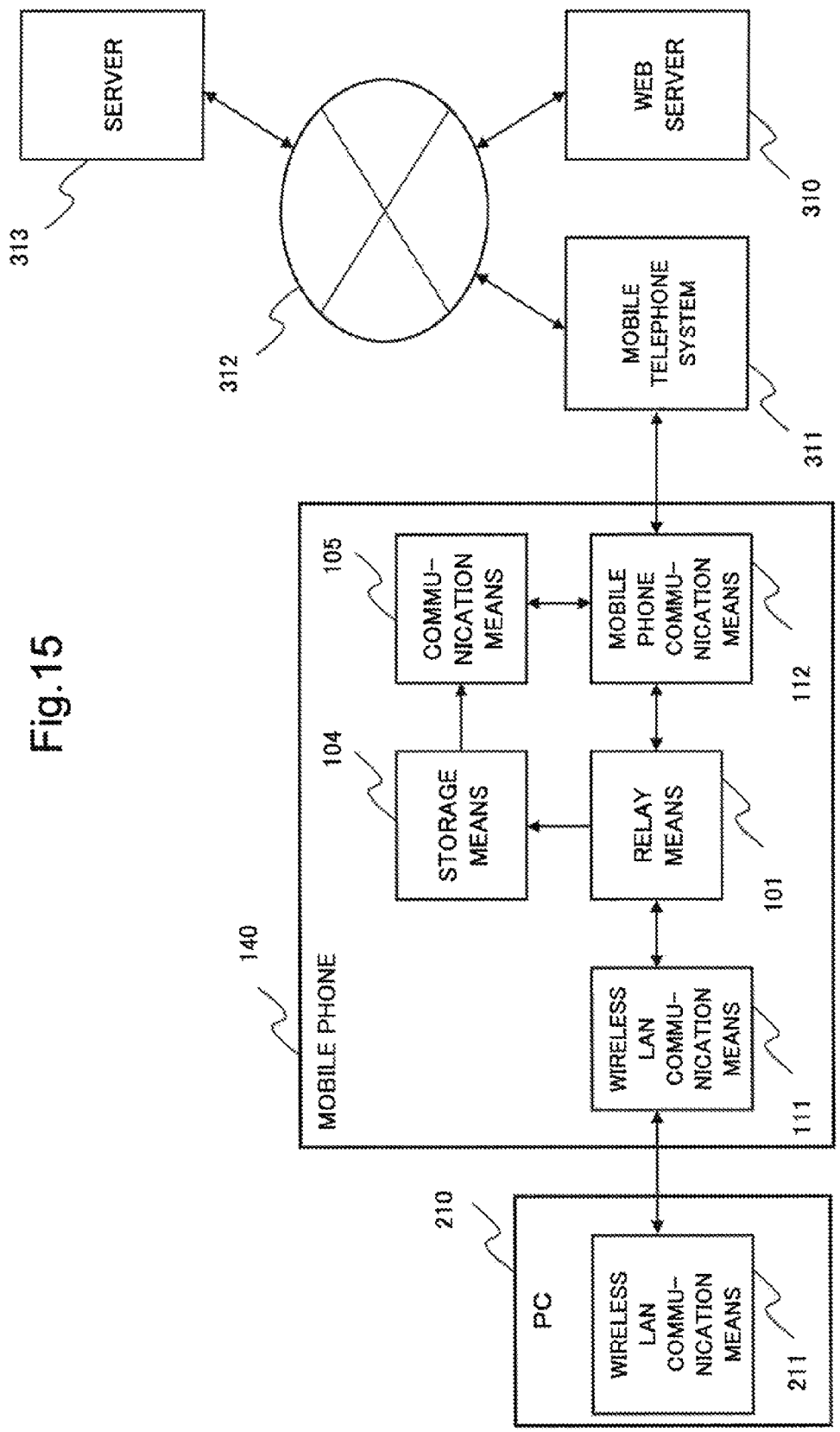
FIG. 15 is a block diagram showing a configuration of a communication system according to a fourth embodiment of the present invention.

Next, according to the fourth embodiment of the present invention, the embodiment in detail of the present invention will be described with reference to a drawing. FIG. 15 is the block diagram showing the configuration of the communication system according to the fourth embodiment. FIG. 15 shows details of the internal configuration of the mobile phone 110 which is the relay device, as a specific example of the communication system according to the first embodiment shown in FIG. 5. The communication system according to the present embodiment includes a mobile phone 140, the PC 210 and the web server 310. The mobile phone 140, the PC 210 and the web server 310 respectively correspond to the relay device 100, the first communication device 200 and the second communication device 300 in the communication system according to the first embodiment shown in FIG. 1.

The mobile phone 140 connects the PC 210 with the Internet 312 by relaying communications of the PC 210. As the result, the mobile phone 140 can access to the web server 310 and the server 313 or the like which are connected with the Internet 312.

As shown in FIG. 15, the mobile phone 140 includes the relay means 101, the wireless LAN communication means 111, the mobile phone communication means 112, the storage means 104 and the communication means 105. It is clear that the mobile phone 140 is the same as the above-mentioned dual-mode mobile phone terminal. The wireless LAN communication means 111 and the mobile phone communication means 112 respectively correspond to the first connecting means 102 and the second connecting means 103. The PC 210 includes the wireless LAN communication means 211.

The wireless LAN communication means 111 physically and logically connects the mobile phone 140 and the PC 210. Accordingly, the mobile phone 140 and the PC 210 can communicate each other. An example of the wireless LAN communication means 111 includes a wireless LAN which conforms to IEEE 802.11 standards. Further, the communication method between the mobile phone 140 and the PC 210 is not limited to the wireless LAN. For example, it can also use any short range wireless communication systems such as Bluetooth or Zigbee.

The mobile phone communication means 112 connects the mobile phone 140 with the mobile telephone system 311. An example of the mobile telephone system includes a cellular network such as the 3rd generation mobile phone (henceforth, referred to as "3G mobile phone") system and the GSM (Global System for Mobile communication). The mobile telephone system 311 and the web server 310 are connected via the Internet 312. Accordingly, the mobile phone 140 and the web server 310 can communicate each other. In this case, the mobile phone communication means 112 logically connects the mobile phone 140 with the web server 310.

The relay means 101 relays the communications between the PC 210 and the web server 310. The relay means 101 includes such as a router function or a proxy server function which have a transferring function of TCP/IP (Transfer Control Protocol/Internet Protocol) packets.

By applying the above described configuration, the PC 210 which has only the short range wireless function can connects with the wide area network such as the Internet 312, and can communicate with the web server 310.

The relay means 101 also has a function of extracting communication information from communications between the PC 210 and the web server 310. "Extract" means to select desired information from the communication information, and output as the storage information. Specifically, information of the communication information includes such as information which the PC 210 sends and receives when using a name resolution service (Domain Name Service, hereinafter referred to as "DNS"), and information which it sends and receives when communicating using HTTP (HyperText Transfer Protocol). The relay means 101 analyzes the contents of the communication information, extracts the storage information and outputs to the storage means 104.

The storage information can include information for identifying the communication apparatus such as a DNS host name and an IP address or the like. Alternatively, the storage information can include information for identifying the storage location of the information such as a URL included in a HTTP request and a HTTP response. Further, the storage information can include information such as a title, a keyword and a meta-tag which are included in header information of the HTTP response. Moreover, the storage information can include information of the cookie which is set at the HTTP communications.

The mobile phone 140 includes not only a terminal function which receives services by connecting with the Internet 312, but also a relay function of simply relaying the communications among other communication devices. For that purpose, the mobile phone 140 has the communication means 105. The communication means 105 includes a control function of the communication between the mobile phone 140 and the communication device on the Internet 312, as well as a function of receiving communication services from the communication device on the Internet 312. As it was described above, the communication means 105 includes the communication control function and the communication application function. Example of the communication applications includes such as the web browser and the mailer. After the communication applications retrieve the information such as an access history of web and bookmarks, stored passwords and the cookies which are the storage information stored in the storage means 104, they are reused in the case that the mobile phone 140 communicates as the communication terminal.

The PC 210 is a communication terminal which is connected with the Internet 312 via the mobile phone 140 and receives services from the web server 310 on the Internet. Therefore, the PC 210 has client functions including the web browsing and the mailing in order to receive network services.

Further, a network which can be used in the fourth embodiment is not limited to the Internet. A LAN and an intranet can also be used. In addition, the communication means between the mobile phone 140 and the Internet 312 are not limited to the mobile telephone system 311 such as the 3G mobile phone or the GSM or the like. It can also employ a wide area access network such as WiMAX (Worldwide Interoperability for Microwave Access) or the like as the communication means.

Figure 16:
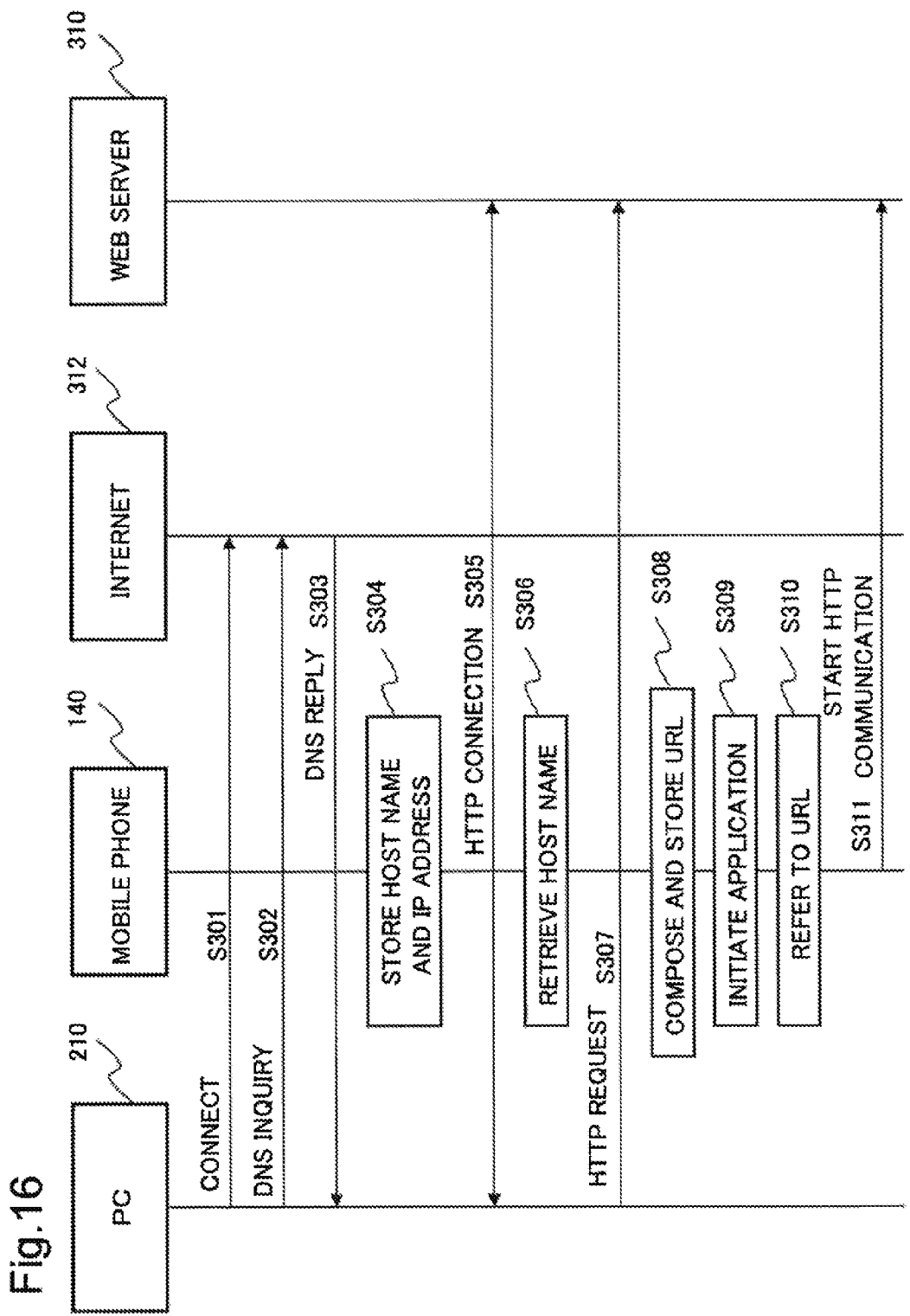
FIG. 16 is a sequence chart showing operations of the communication system according to the fourth embodiment of the present invention.

Next, the operations of the communication system according to the fourth embodiment will be described in detail. FIG. 16 is the sequence chart showing the operations of the communication system according to the fourth embodiment. As described above, following to the communication system according to the present embodiment, the PC 210 is connected with the web server 310 via the mobile phone 140, and receives the web services from the web server 310.

At first, the mobile phone 140 establishes a connection with the PC 210 using the wireless LAN communication means 111 and also establishes a connection with the internet 312 using the mobile phone communication means 112 (Step S301). After both of these connections have been established, the mobile phone 140 begins to relay the communication between the PC 210 and the Internet 312 using the relay means 101.

In the following descriptions, as an example of the operations of the PC 210, a case where the PC 210 connects with the web server 310 using the HTTP and receives the web services from the web server 310 is described. At first, in order to confirm the IP address of the web server 310, the PC 210 transmits a DNS inquiry packet (henceforth, referred to as "DNS query packet") to the DNS server (not illustrated in the figure). The DNS server can be embedded in the mobile phone 140, or can exist on the Internet 312. In both cases, the DNS query packet is transmitted to the mobile phone 140. The mobile phone 140 transfers the DNS query packet to the DNS server (Step S302). In the case where the DNS server exists on the Internet 312, the mobile phone 140 transfers the DNS query packet to the DNS server by transmitting the DNS query packet to the Internet 312.

The mobile phone 140 stores the contents of the DNS query packet using the storage means 104 and analyzes the contents, while it transfers the DNS query packet to the DNS server. Specifically, the mobile phone 140 extracts a host name of the web server 310 which the name resolution should be resolved. The DNS server replies the DNS response packet. The mobile phone 140 transfers the DNS response packet to the PC 210 (Step S303). At that time, the mobile phone 140 analyzes the contents of the DNS response packet and extracts the IP address of the web server 310 which is included in the packet. Then, the mobile phone 140 correlates the host name of the web server 310 which is extracted beforehand and the IP address, and memorizes it using the storage means 104 (Step S304).

Next, in order to connect to the web server 310 and receive the services, the PC 210 begins to connect by the HTTP protocol. Specifically, the PC 210 designates the port number (usually, it is 80) for HTTP and transmits a TCP connection request packet to the web server 310. The mobile phone 140 transfers the TCP connection request packet to the web server 310. As a result, the connection at the layer of the TCP will be established between the PC 210 and the web server 310 (Step S305).

The relay means 101 monitors the communication information which are sent and received between the PC 210 and the web server 310, and detects that the PC 210 tries to establish the connection with the web server 310. Then, the relay means 101 retrieves the host name of the web server 310 by searching the destination IP address transmitted from the PC 210 by the storage means 104 (Step S306).

When the connection at the TCP has been established, the PC 210 transmits a packet (i.e. request message packet) including the request message of the HTTP. In general, the request message at this stage is a GET method or a POST method of the HTTP. The request message includes a path name of the request. The mobile phone 140 transfers the request message packet to the web server 310 (Step S307). The relay means 101 monitors the request message packet and extracts a path of the requested destination. Then, the relay means 101 correlates the extracted path and the host name of the web server 310 which is stored in a previous step, and composes the URL (i.e. request URL) of the requested destination.

For example, in the case that the host name of the web server 310 is "www.example.com", and the path name is "/foo/bar/index.html", it can be recognized that the requested URL which the PC 210 transmitted is "http://www.example.com/foo/bar/index.html". The mobile phone 140 records the requested URL in the storage means 104 (Step S308). As described above, the mobile phone 140 records the request which the PC 210 executed to the web server 310.

Next, operations when a communication application in the communication means 105 connects with the web server 310 and receives communication services will be described. Where, it is supposed that the communication application is the web browser. At first, the communication means 105 initiates the communication application following to a direction by a user of the mobile phone 140 (Step S309). Then, the communication means 105 refers to an access history which is the storage information of the URL (Step S310). The communication application refers to the storage means 104, and extracts from the storage means 104 "http://www.example.com/foo/bar/index.html" which is the URL that the PC 210 accessed formerly and displays it. In the case that presented URL meets a desires one, the user selects it. Then, the communication means 105 starts to communicate with a communication device designated by the URL which is selected by the user (Step S311). As a result, the user can communicate with the desired communication device using the access history which the PC 210 performed in the past, without inputting once again the URL or the like of the web server 310 which the user designated.

Further, because a volume of datum becomes enormous in the case that all histories of the URLs are recorded, following URLs can be excluded from the storing target. For example, because the necessity as the history is low, the image data or the like such as ".gif", ".jpg" and ".png" that do not have the extension ".html" of the URL are not stored as the history. In addition, those URLs that are registered already need not to be registered again in the storage means 104.

Incidentally, following to the communication system according to the fourth embodiment, the relay means 101 acquires the communication information by monitoring the communication of the HTTP. As an alternative method of acquiring the communication information datum, a method can be considered where it mounts on the mobile phone 140 an application level gateway function which is similar to a HTTP proxy server. That is, as the gateway function, the mobile phone 140 monitors the communication information when it relays the communication information between the PC 210 and the web server 310. Then, the mobile phone 140 stores the communication information in accordance with necessities.

Further, according to the above-mentioned embodiment, the information which the mobile phone 140 stores is the history of the URL. In the present invention, kinds of the storage information are not limited to a specific one. For example, the mobile phone 140 can store authentication information inputted to the PC 210 at the web access and at a FTP (File Transfer Protocol) access. Specifically, the mobile phone 140 monitors the communication information and detects and records an ID and a password. Accordingly, because the communication application can reuse its ID and the password, the user does not need to input the ID and the password once again.

In addition, the mobile phone 140 can store a session identifier (session ID) which is transmitted from the web server 310. A cookie, which is transmitted from the web server 310 to the PC 210 which is the client, can include the session ID. Then, the mobile phone 140 stores the cookie. Further, the communication application reuses the session ID in the cookie or other information in accordance with necessities. Following to the stated procedure, the communication application in the mobile phone 140 can succeed the session which the PC 210 established with the web servers 310.

A specific example where it can use the handing over of the session includes a net shopping at a certain shopping site using the web browser in the PC 210. It is supposed that some goods of the shopping site were put in a cart by the web browser of the PC 210. At that time, the web server of the shopping site transmits a cookie including a session ID to the PC 210 in order to store it in the web browser of the PC 210. At this time, the mobile phone 140 detects and stores the cookie. Then, the communication application of the mobile phone 140 can succeeds the session using the stored session ID. As the result, the communication application in the mobile phone 140 can browse the cart: At that time, the situation of the shopping site (i.e. login status and goods in the cart) browsed by the communication application is the same as the one browsed by the web browser of the PC 210.

Further, the information that should be stored in the storage means 104 can include the information in the communication which a communication application 16 transmitted, in addition to the information in the communication which is transmitted from the PC 210.

As it is described above, following to the communication system according to the fourth embodiment, the mobile phone 140 monitors communication contents exchanged between the PC 210 and the web server 310 and stores necessary information. Therefore, the communication application which is executing in the mobile phone 140 can communicate using the storage information. Accordingly, a user of the mobile phone 140 does not need to input the information once again, and an effect that the conveniences are improved can be obtained.

(Fifth Embodiment)

Next, the communication system according to a fifth embodiment of the present invention will be described. While one kind of the PC 210 was included according to the fourth embodiment, it is presumed that a plurality number of and a plurality kinds of the PC 210 exist at the same time in the fifth embodiment. The configuration of the communication system according to the present embodiment is the same as the one according to the fourth embodiment shown in FIG. 15.

According to the fifth embodiment, in the case that it relays and stores the communications of the PC 210, the mobile phone 140 determines a classification of the PC 210 and stores the information including the classification of the PC 210 in the storage means 104. A specific method includes a method of referring a value of the user-agent header which is included in the HTTP request which the PC 210 exchanged. By referring to the value of the header, a classification of the PC 210 (i.e. classification of browser and classification of versions of OS or the like) can be analyzed. Alternatively, by referring to a source IP address and a MAC address which are being sent from the PC 210, the classification of the PC 210 can be also analyzed. Further, a client using the authentication information which is used when it connects the PC 210 by a wireless communication using a communication means 11 can be classified. Here, the authentication information at here includes, for example, a WEP key and the WPA passphrase which are used in an authentication method of the wireless LAN and the wireless LAN connection.

In the case where the communication application 16 refers to the storage information, it re-arranges the information in an order for each classification of the PC 210, and displays it using a display means included in the PC 210.

Next, it will describe an effect according to the fifth embodiment. Following to the communication system according to the embodiment, the user can check the information in accordance with the classification of the PC 210 and utilize the information in accordance with the classification. For example, the history of browser of the PC and the history of browser of the game machine are displayed independently. Accordingly, the user can select the target information easily.

(Sixth Embodiment)

Next, the communication system according to the sixth embodiment of the present invention will be described. According to the fourth and the fifth embodiment, the mobile phone 140 refers to the communication contents of the PC 210 and records the information automatically. According to the sixth embodiment, it is determined whether the mobile phone 150 records the information or not based on directions from a PC 220.

Figure 17:
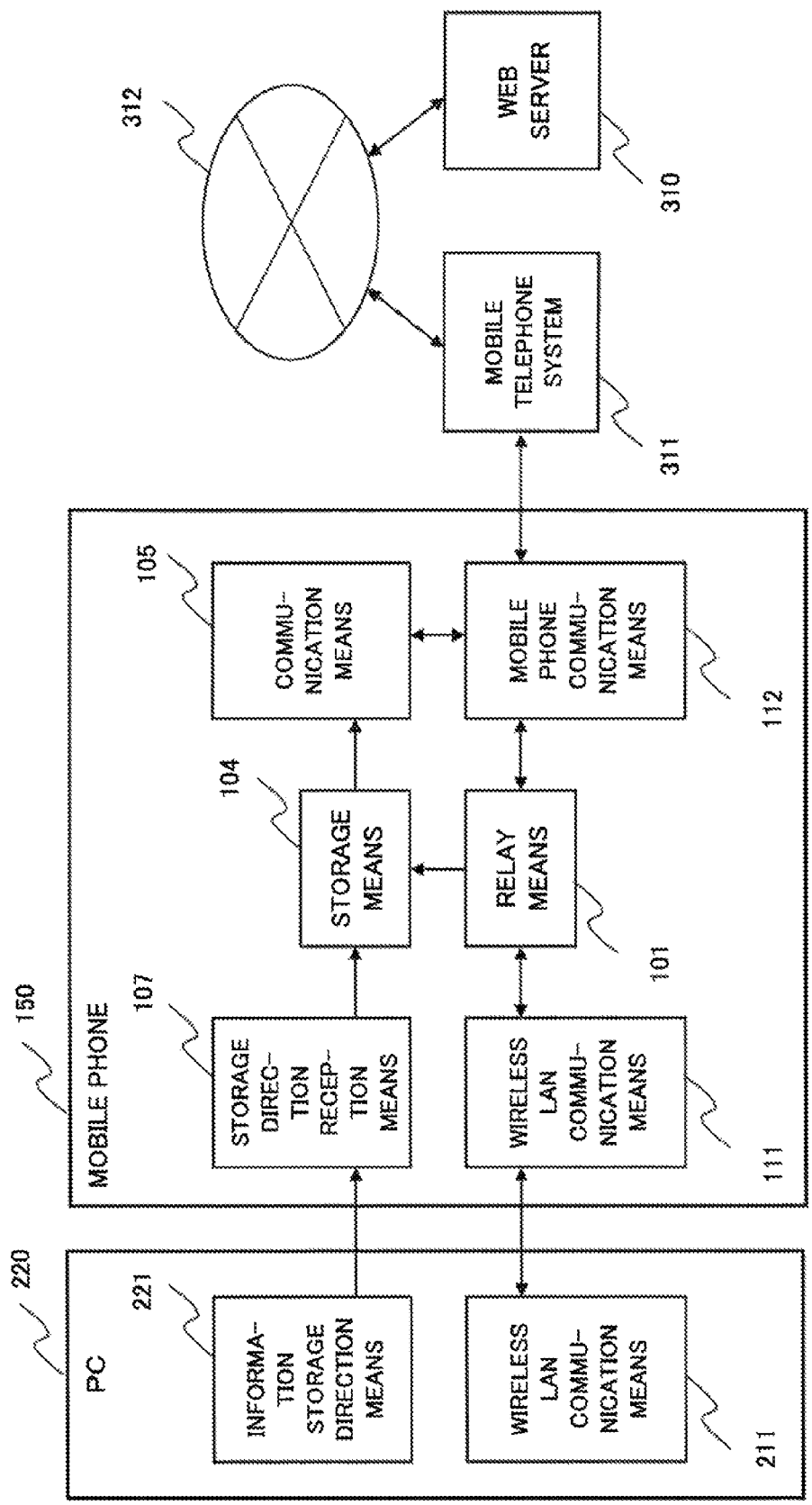
FIG. 17 is a block diagram showing a configuration of a communication system according to a sixth embodiment of the present invention.

FIG. 17 is the block diagram showing the configuration of the communication system according to the sixth embodiment. The PC 220 includes an information storage direction means 221. The mobile phone 150 includes a storage direction reception means 107.

When that the information which should be stored is transmitted, the PC 220 directs to store the information to the storage direction reception means 107 in the mobile phone 150 using the information storage direction means 221. At that time, the PC 220 also attaches storage information direction information which directs which information should be stored, and directs to the storage direction reception means 107. A storage direction reception function 107 stores the directed information in the storage means 104 according to the storage information direction information.

A specific example of an application of the embodiment includes a case where the web browser, which is executed in the PC 220, stores a bookmark. In this case, the web browser directs the storage direction reception means 107 to store the URL of the bookmark which should be stored using the information storage direction means 221. The storage direction reception means 107 stores directed URL in the storage means 104. In this way, the mobile phone 150 can store the information based on the directions from the PC 220.

In the above-mentioned example, the PC 220 issues the information storage direction. The information storage direction can be issued by the web server 310. Specifically, the direction information which directs the web browser to record the communication information should be included as information in the HTTP response, so as not to influence on the contents itself. For that purpose, a method can be considered where it includes the direction information using a meta-tag at a header of the contents using HTML (Hyper Text Markup Language). It can embed any information in the HTML contents relatively freely if it uses the meta-tag. Alternatively, instead of in the meta-tag of the HTML, it can include the information in the header of the HTTP response.

As it is described above, following to the communication system according to the sixth embodiment, the information is stored based on the user's directions or the directions from the server side. In an operation like the bookmark storing, the communication is not performed at a time of storing. Therefore, the mobile phone 150 using a method of monitoring and storing the communication information cannot store the information.

In contrast, following to the communication system according to the sixth embodiment, because the information storage direction means specifically issues the information storage direction to the storage direction reception means, it is possible to store the information even in the case where the communications do not occur. That is, the storage means 104 stores the information directed by the information storage direction as the bookmark based on the information storage direction.

A specific example of the storage method of the above-mentioned information is described. For example, there is a method where the web server function is installed in the mobile phone and a URL is notified using the HTTP protocol from the PC to the web server function. It supposes that a URL which should be registered is "http://example.com", and a URL for the URL storing directions of the web server which is inside of the mobile phone is "http://keitai.local/register_bookmark". Then, by an access from the PC to "http://keitai.local/register_bookmark?url=http://example.com", it can direct the web server to store "http://example.com".

Further, following to the communication system according to the embodiment, when the communication between the PC and the server is encrypted, it can use the storing function of the information even in the case that the communication path is encrypted. In the case where the communications are encrypted, the mobile phone 110 or the like cannot monitor the sending and receiving of the communication information. Therefore, according to the fourth and the fifth embodiment, the communication information cannot be stored.

In contrast, according to the sixth embodiment, the PC directs the mobile phone to store the information. Therefore, even when the communication between the PC and the web server is encrypted, the mobile phone can store the directed information based on information storing directions from the PC. In this manner, according to the sixth embodiment, even if the communications between the PC and the web server are encrypted, an effect that it can store the communication information can be obtained.

(Seventh Embodiment)

Next, the communication system according to the seventh embodiment of the present invention will be described.

Figure 18:
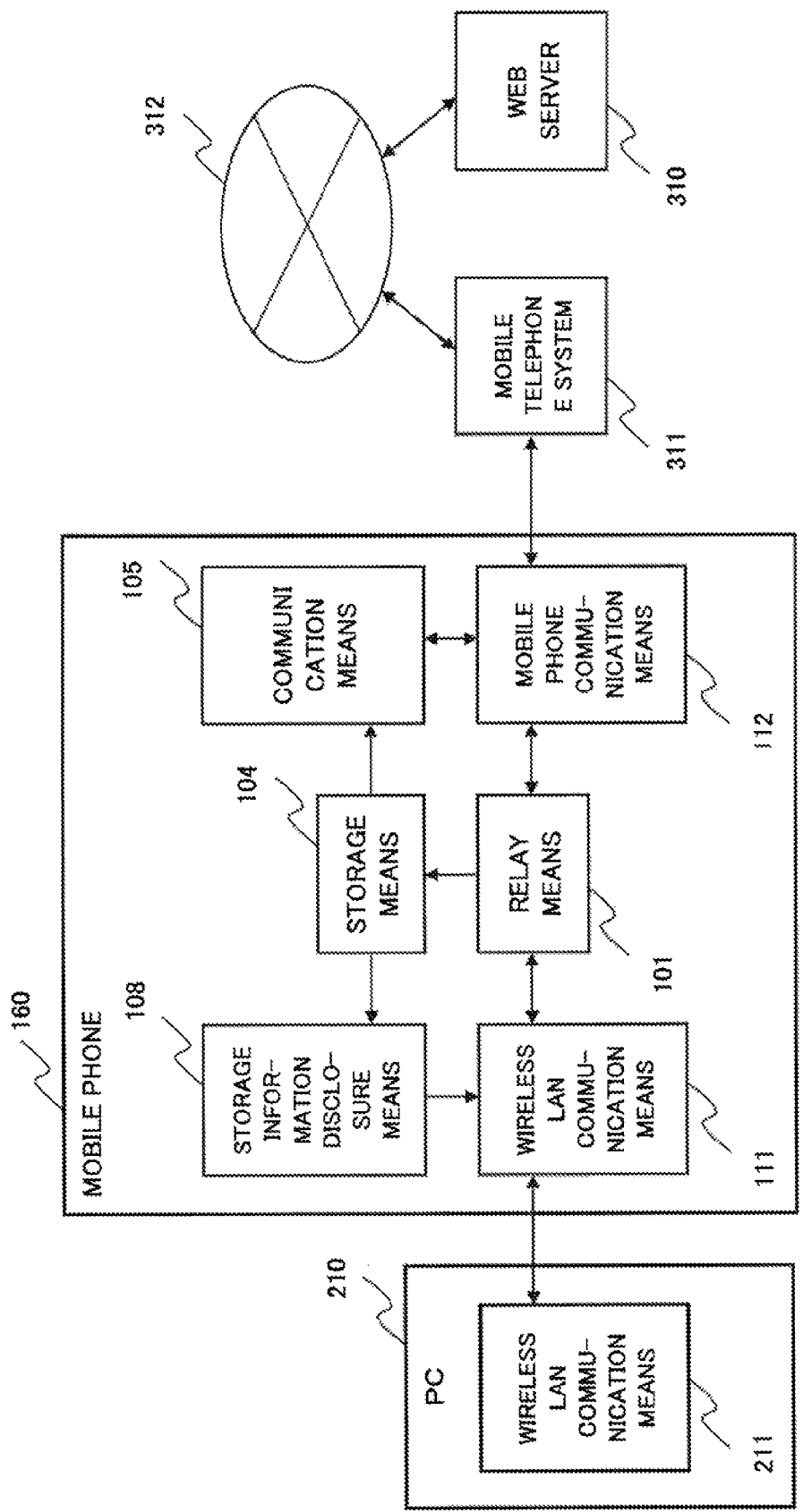
FIG. 18 is a block diagram showing a configuration of a communication system according to a seventh embodiment of the present invention.

FIG. 18 is the block diagram showing the configuration of the communication system according to the seventh embodiment. Following to the communication system according to the seventh embodiment, a mobile phone 160 includes a storage information disclosure means 108. The storage information disclosure means 108 discloses the information stored in the storage means 104 to outside of the communication system. A specific example of the storage information disclosure means 108 includes various configurations such as the web server or a FTP server. The present embodiment is described based on a presumption that the storage information disclosure means 108 is a web server function which is embedded in the mobile phone 160.

The storage information disclosure means 108 discloses the information stored in the storage means 104 to outside of the communication system. For example, the storage information disclosure means 108 discloses the stored information on the access history and the bookmark of the web by a form of HTML file to outside by the HTTP protocol. Specifically, the storage information disclosure means 108 extracts the storage information from the storage means 104 and transmits to the outside using the wireless LAN communication means 111. Alternatively, the storage information disclosure means 108 can transmit via the mobile telephone system using the mobile phone communication means 112 to the Internet 312. Herewith, the external other communication devices can connect to services which the PC 210 accessed formerly, and the external other communication devices can refer to the information in the mobile phone 160.

Note that, in the case that the information is disclosed to outside, the information can be disclosed just as it is without any processing. Alternatively, the information can be disclosed after being processed. For example, the web access history information can be sorted by such as a higher order of access frequency, an order of access date or an order of name of the home page. Then, the sorted information can be disclosed after the rearranged information is arranged and allocated in the HTML page. In addition, the information on the access frequency and the access date can also be allocated in the HTML page and is disclosed simultaneously.

As it is described above, following to the communication system according to the seventh embodiment, bookmarks and access histories of the communication application are disclosed to outside. That is, an external device can refer to the storage information accumulated in the mobile phone. Accordingly, as an example, an effect that the external device can refer to the bookmarks and the access histories of the communication application which are stored in the mobile phone and, in addition, the external device can communicate using those can be obtained. In the case where a plurality of external devices exist, an effect that the external devices can refer to the bookmarks of the external device and the information on the access histories, in other words, the storage information can be shared, can be obtained.

Note that, each of the above mentioned embodiments can be combined with the other embodiments. For example, it can combine the sixth and the seventh embodiment, and the mobile phone can include both of the reception function of the information storage direction and the information disclosure function.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2009-073220, filed on 25 Mar. 2009, the disclosure of which is incorporated herein in its entirety by reference.

Industrial Applicability

The relay device according to the present invention can be applied to relay devices which have the communication functions in it. In addition, the communication system according to the present invention can be applied to communication systems which relay using the relay devices which have the communication functions in it.

Description of the Code

312 Internet.

The invention claimed is:

1. A relay device comprising:
first connecting unit circuitry for connecting with a first communication device;
second connecting unit circuitry for connecting with a second communication device;

relaying unit circuitry which is connected with said first communication device using said first connecting unit and is connected with said second communication device using said second connecting unit, for relaying first information which is communicated between said first communication device and said second communication device, and outputting second information which is all or a part of said first information to an equipment other than said first communication device and said second communication device; and communication unit circuitry for communicating using said outputted second information, wherein said communication unit circuitry includes a communication application which makes said relay device function as a communication terminal possible to utilize the internet service by using said outputted second information.

2. The relay device according to claim 1 further comprising: third connection unit circuitry for connecting with a third communication device which communicates using said second information.

3. The relay device according to claim 1, further comprising: storage unit circuitry for storing said second information.

4. The relay device according to claim 3, further comprising: an information output unit circuitry for outputting said second information based on a predetermined external output direction.

5. The relay device according to claim 1 wherein
said relay unit stores said second information using an external storage unit.

6. The relay device according to claim 1 wherein
said relay unit stores said second information based on a storing direction from said first communication device or said second communication device.

7. The relay device according to claim 6 wherein
said relay unit stores said second information based on storage direction information which is included in said first information.

8. The relay device according to claim 1 wherein
said second information includes device identification information for identifying said second communication device.

9. The relay device according to claim 1 wherein
said second information includes storage location identification information for identifying a storage location of storage information stored in said second communication device.

10. The relay device according to claim 1 wherein
said second information includes information identification information for identifying the storage information stored in said second communication device.

11. The relay device according to claim 1 wherein
said second information includes program identification information for identifying a program executed in said first communication device.

12. The relay device according to claim 1 wherein
said second information includes device identification information for identifying an input and output device which inputs and outputs information to and from a program which is executed in said first communication device.

13. The relay device according to claim 1 wherein
said second information includes communication identification information for identifying a series of communications from start to end which are exchanged between said first communication device and said second communication device.

14. The relay device according to claim 13, further comprising: communication unit circuitry for continuing communications with said second communication device instead of said first communication device using said communication identification information.

15. The relay device according to claim 13, further comprising: fourth connection unit circuitry for connecting the communication for continuing communications with said second communication device instead of said first communication device using said communication identification information.

16. The relay device according to claim 1 wherein
said second information includes an authentication information for acquiring an authentication by said second communication device.

17. The relay device according to claim 16, further comprising: communication unit circuitry for acquiring said authentication by said second communication device using said authentication information.

18. The relay device according to claims 16, further comprising: fifth connection unit circuitry for connecting the communication for acquiring said authentication by said second communication device using said authentication information.

19. A relay device comprising:
first connecting unit circuitry which connects with a first communication device;
second connecting unit circuitry which connects with a second communication device;
relaying unit circuitry which is connected with said first communication device using said first connecting unit and is connected with said second communication device using said second connecting unit, for relaying first information which is communicated between said first communication device and said second communication device, and outputting second information which is all or a part of said first information to an equipment other than said first communication device and said second communication device; and
communication unit circuitry for communicating using said outputted second information,
wherein said communication unit circuitry includes a communication application which makes said relay device function as a communication terminal possible to utilize the internet service by using said outputted second information.

20. A relay system comprising:
a first communication device;
a second communication device; and
a relay device including the relay unit according to claim 1.

21. A relay method in a relay device comprising:
relaying first information which is communicated between a first communication device and a second communication device;
outputting second information which is all or a part of said first information; and
communicating using said second information to an equipment other than said first communication device and said second communication device; and
including a communication application which makes said relay device function as a communication terminal possible to utilize the internet service by using said second information.

22. A relay device control program for forcing a computer which is mounted on a relay device and is connected with a first communication device and a second communication device to execute functions comprising:

relay unit circuitry which relays first information which is communicated between said first communication device and said second communication device; and output unit circuitry which outputs second information which is all or a part of said first information to an equipment other than said first communication device and said second communication device;

communication unit circuitry for communicating using said outputted second information, wherein said communication unit circuitry includes a communication application which makes said relay device function as a communication terminal possible to utilize the internet service by using said outputted second information.

23. A non-transitory computer-readable storage medium for storing the relay device control program according to claim 22.

* * * * *